(12) United States Patent
Chun et al.

(10) Patent No.: US 9,776,175 B2
(45) Date of Patent: Oct. 3, 2017

(54) IRON-BASED CATALYST AND METHOD FOR PREPARING THE SAME AND USE THEREOF

(71) Applicant: KOREA INSTITUTE OF ENERGY RESEARCH, Daejeon (KR)

(72) Inventors: Dong Hyun Chun, Daejeon (KR); Ji Chan Park, Daejeon (KR); Heon Jung, Daejeon (KR); Ho-Tae Lee, Daejeon (KR); Jung-Il Yang, Daejeon (KR); Sungjun Hong, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 13 days.

(21) Appl. No.: 14/743,456

(22) Filed: Jun. 18, 2015

(65) Prior Publication Data
US 2016/0045901 A1    Feb. 18, 2016

Related U.S. Application Data

(63) Continuation-in-part of application No. PCT/KR2013/004271, filed on May 14, 2013.

(30) Foreign Application Priority Data

Mar. 19, 2013 (KR) .......................... 10-2013-0029168
Aug. 1, 2014 (KR) .......................... 10-2014-0099079

(51) Int. Cl.
*B01J 27/22* (2006.01)
*C10G 2/00* (2006.01)
(Continued)

(52) U.S. Cl.
CPC .............. *B01J 27/22* (2013.01); *B01J 23/78* (2013.01); *B01J 37/0045* (2013.01); *B01J 37/03* (2013.01);
(Continued)

(58) Field of Classification Search
CPC . B01J 27/22; B01J 23/78; B01J 23/745; B01J 23/862; B01J 23/8892; B01J 37/0045; B01J 37/03; B01J 37/18; B01J 35/002
(Continued)

(56) References Cited

U.S. PATENT DOCUMENTS

| | | | |
|---|---|---|---|
| 4,544,671 A | 10/1985 | Soled et al. | |
| 6,297,394 B1 * | 10/2001 | Voit ................... | B01J 23/8892 502/338 |

(Continued)

FOREIGN PATENT DOCUMENTS

| JP | 54059237 A | * | 5/1979 |
|---|---|---|---|
| JP | 2008-006406 A | | 1/2008 |

(Continued)

OTHER PUBLICATIONS

International Search Report, PCT/KR2013/004271, Dec. 27, 2013.
(Continued)

*Primary Examiner* — Patricia L Hailey
(74) *Attorney, Agent, or Firm* — Patterson + Sheridan LLP

(57) ABSTRACT

The present invention relates to a method for preparing liquid or solid hydrocarbons from syngas via the Fischer-Tropsch synthesis in the presence of iron-based catalysts, the iron-based catalysts for the use thereof, and a method for preparing the iron-based catalysts; more specifically, in the Fischer-Tropsch reaction, liquid or solid hydrocarbons may be prepared specifically with superior productivity and selectivity for $C_{5+}$ hydrocarbons using the iron-based catalysts comprising iron hydroxide, iron oxide, and iron carbide wherein the number of iron atoms contained in the iron hydroxide is 30% or higher, and the number of iron atoms (Continued)

contained in the iron carbide is 50% or lower, relative to 100% of the number of iron atoms contained in the iron-based catalysts.

12 Claims, 10 Drawing Sheets

(51) Int. Cl.
*B01J 37/03* (2006.01)
*B01J 37/18* (2006.01)
*B01J 23/78* (2006.01)
*B01J 37/00* (2006.01)
B01J 23/889 (2006.01)
B01J 23/80 (2006.01)
B01J 35/00 (2006.01)
B01J 35/10 (2006.01)

(52) U.S. Cl.
CPC .............. *B01J 37/18* (2013.01); *C10G 2/332* (2013.01); *B01J 23/80* (2013.01); *B01J 23/8892* (2013.01); *B01J 35/002* (2013.01); *B01J 35/1014* (2013.01); *B01J 35/1019* (2013.01); *B01J 35/1038* (2013.01); *B01J 35/1061* (2013.01)

(58) Field of Classification Search
USPC ....... 502/241, 243, 245, 257, 258, 324, 331, 502/336, 338
See application file for complete search history.

(56) References Cited

U.S. PATENT DOCUMENTS

| | | | |
|---|---|---|---|
| 7,939,463 B1* | 5/2011 | O'Brien | B01J 23/745 423/632 |
| 2004/0007498 A1* | 1/2004 | Gislason | B01J 20/02 208/15 |
| 2004/0077483 A1* | 4/2004 | O'Brien | B01J 19/0093 502/34 |
| 2004/0106517 A1* | 6/2004 | Dlamini | B01J 23/80 502/326 |
| 2004/0254070 A1* | 12/2004 | Ansmann | B01J 23/745 502/338 |
| 2005/0182145 A1 | 8/2005 | Mohedas et al. | |

FOREIGN PATENT DOCUMENTS

| | | |
|---|---|---|
| KR | 20110008591 A | 1/2011 |
| KR | 10-2011-0026709 A | 3/2011 |

OTHER PUBLICATIONS

D. Chun, et al., Highly Selective Iron-Based Fischer-Tropsch Catalysts Activated by CO2-Containing Syngas, Journal of Catalysis 317 (2014) 135-143.
D. Chun, et al., Controlled Activation of Iron-Based Fischer-Tropsch Catalysts Using CO2-Containing Syngas for Enhanced Catalytic Performance, Gordon Research Conferences: 2014 Catalysis, Jun. 22-27, 2014.
Catalysis, Gordon Research Conf., New London, NH, Jun. 22-27, 2014.

* cited by examiner

[FIG. 1]
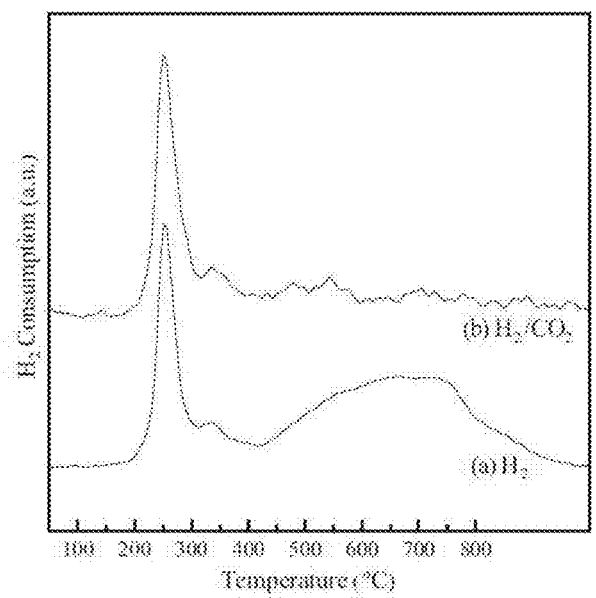
[FIG. 2]
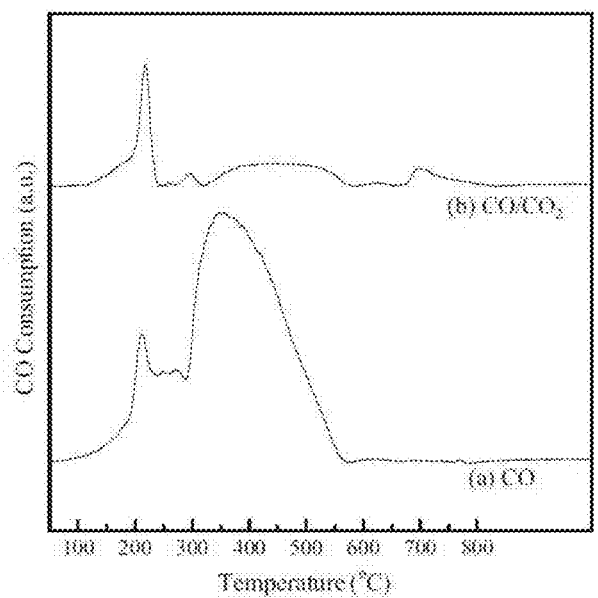

[FIG. 3]
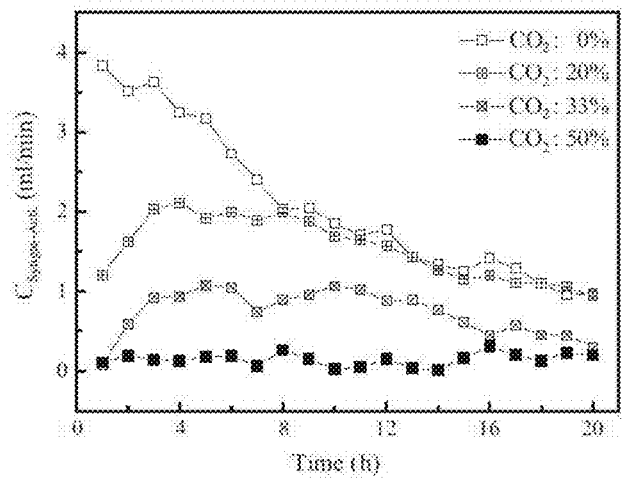
[FIG. 4]
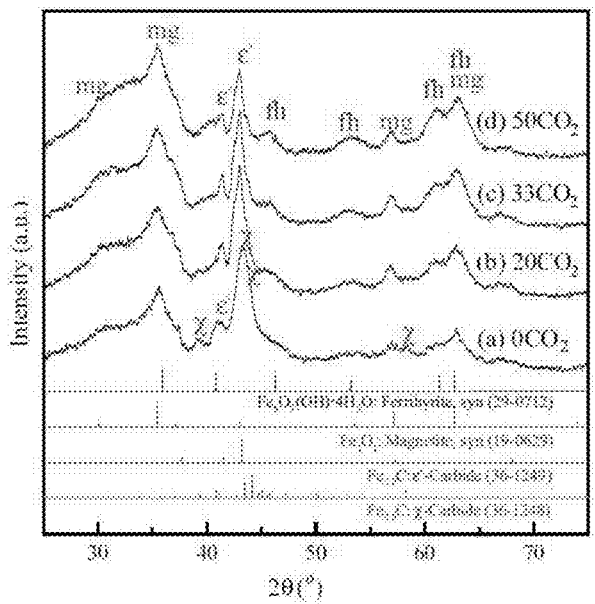

[FIG. 5]
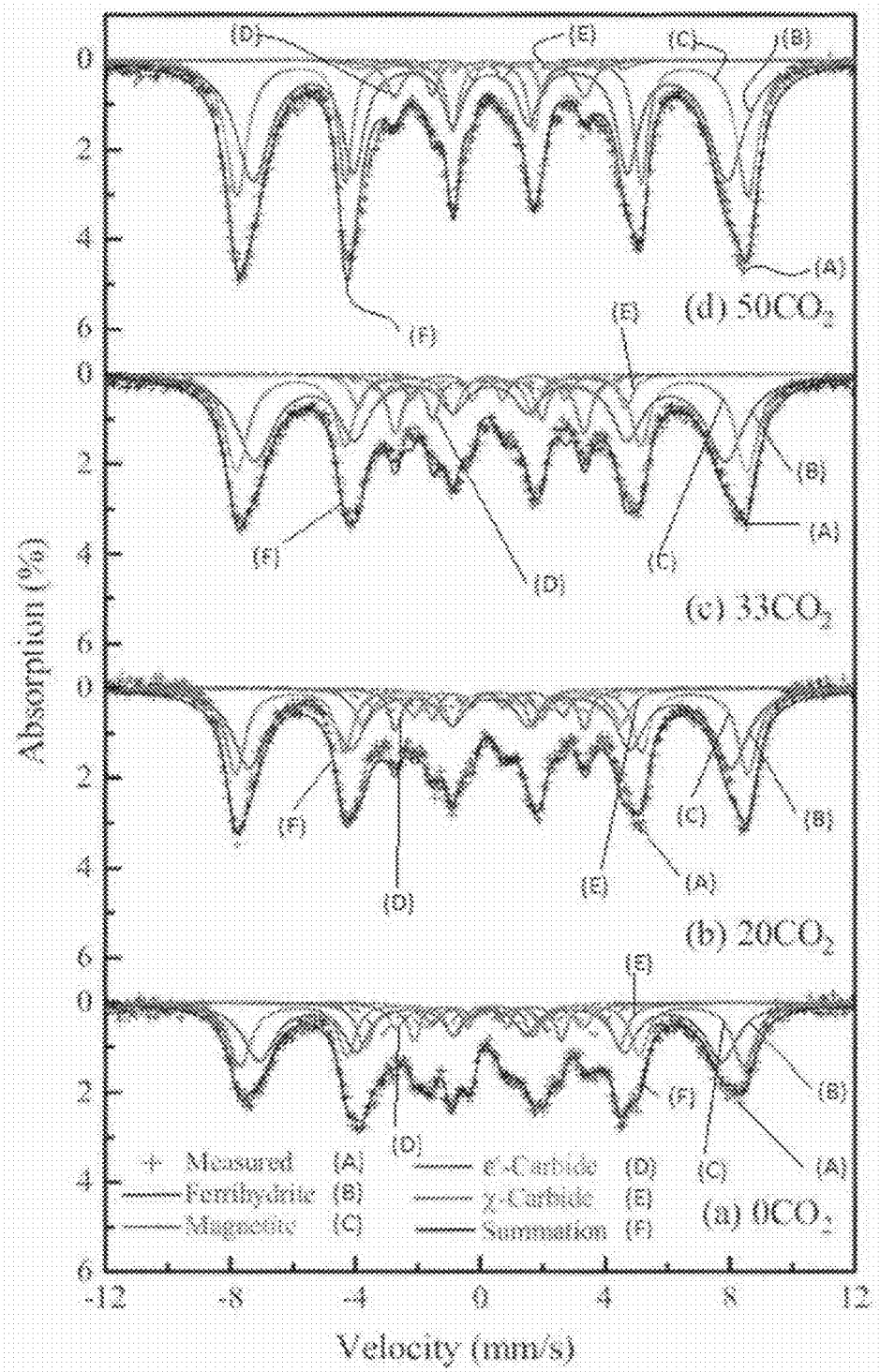

[FIG. 6]
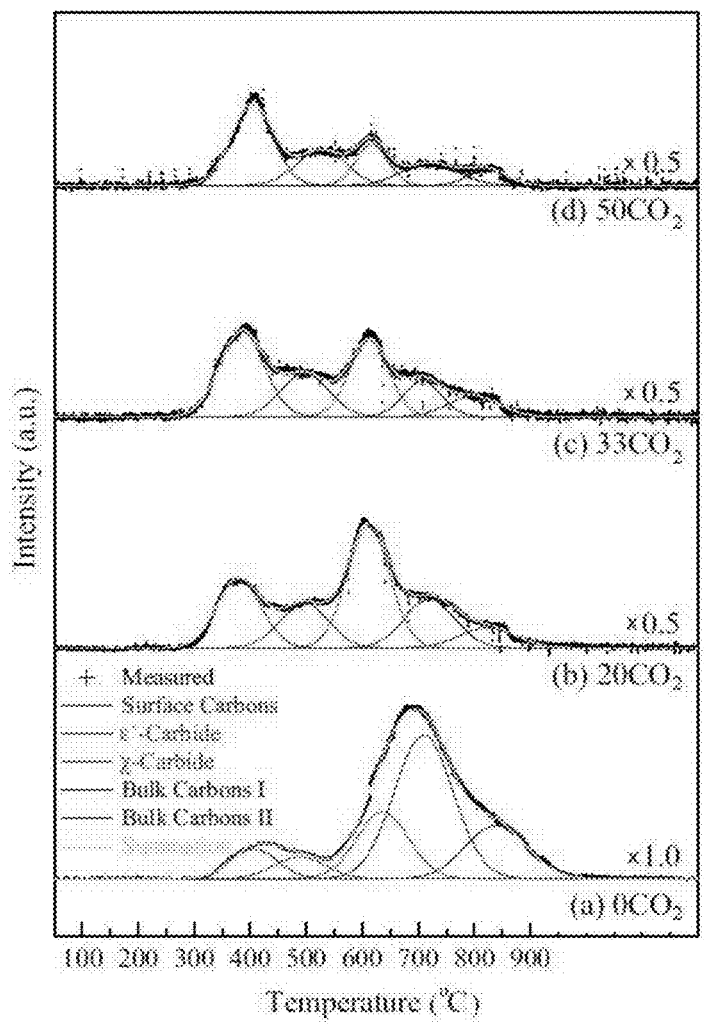

[FIG. 7]
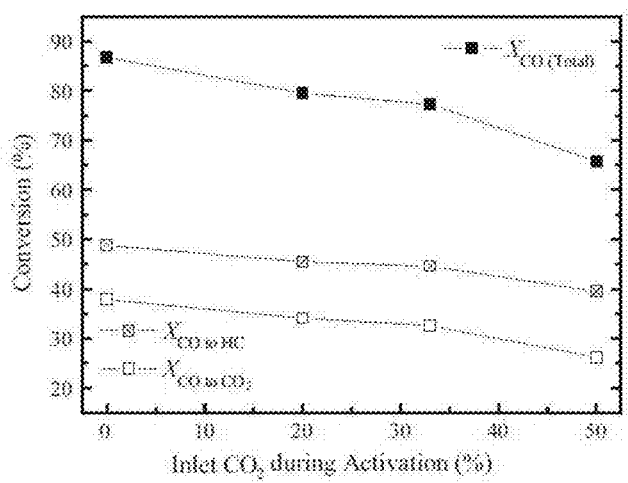
[FIG. 8]
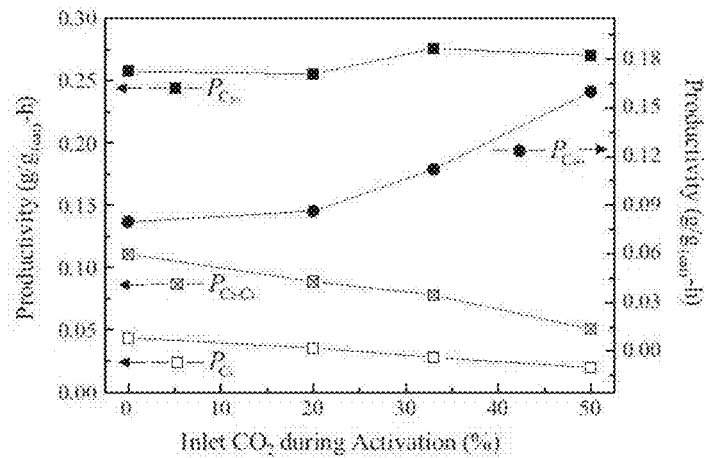

[FIG. 9]
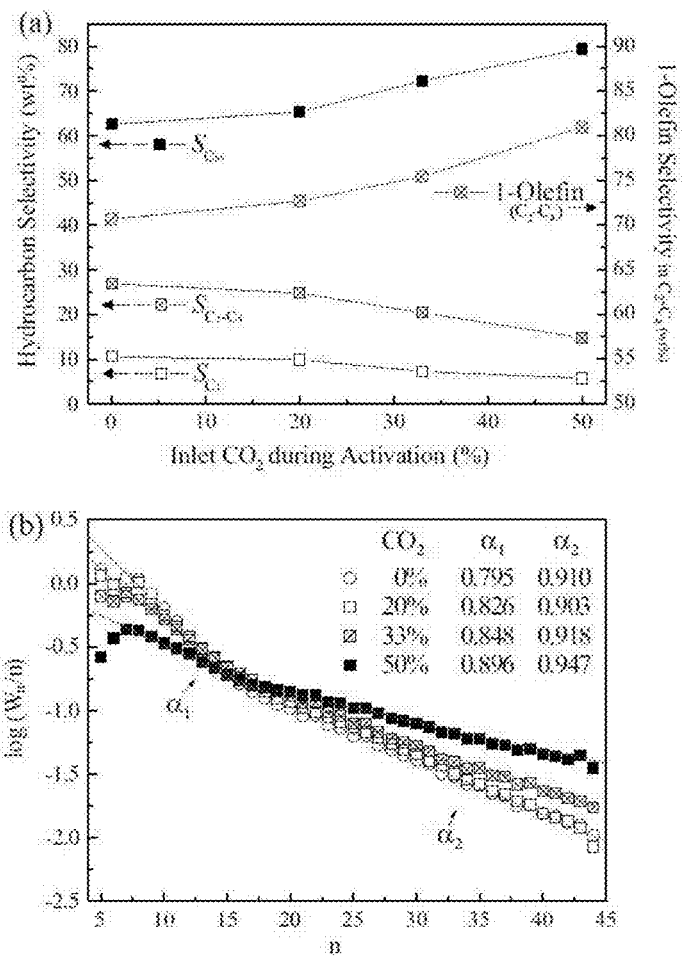
[FIG. 10]
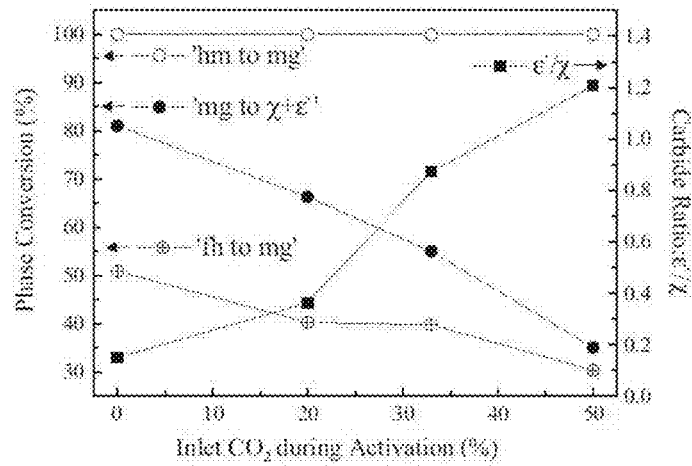

[FIG. 11]
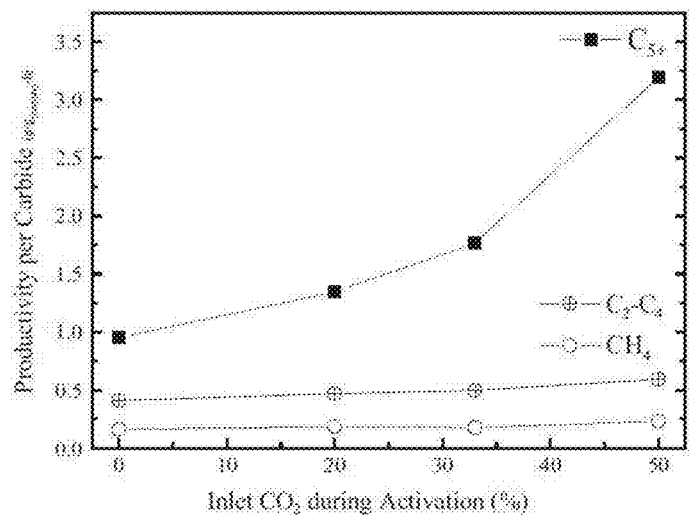
[FIG. 12]
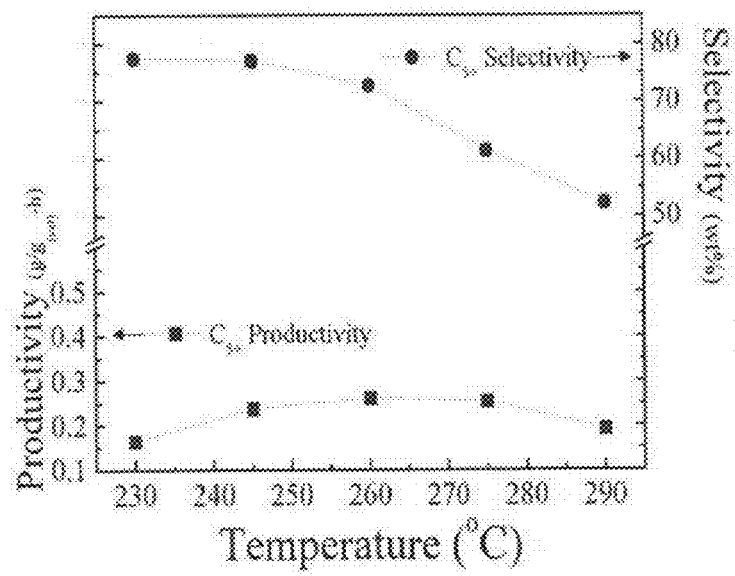

[FIG. 13]
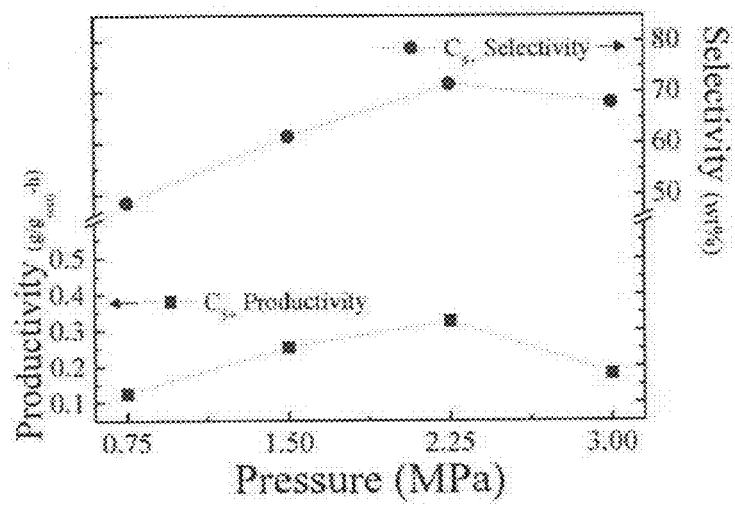
[FIG. 14]
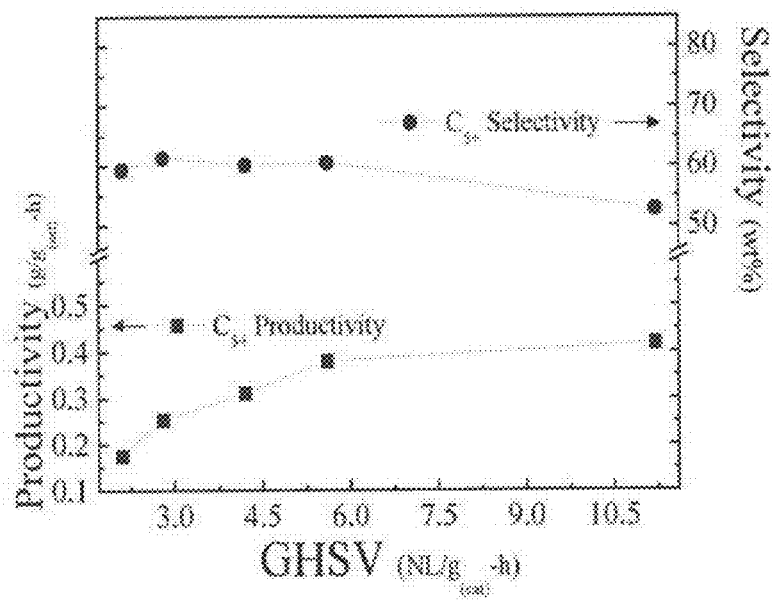

[FIG. 15]
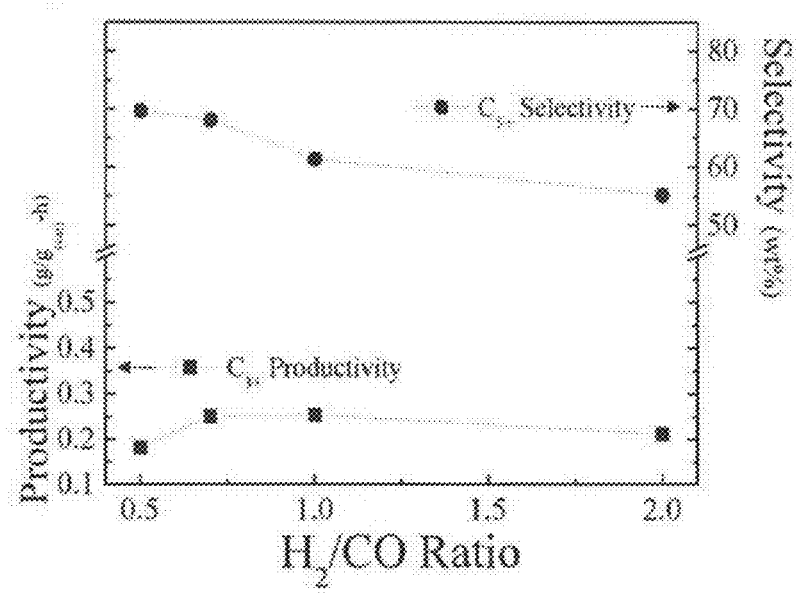
[FIG. 16]
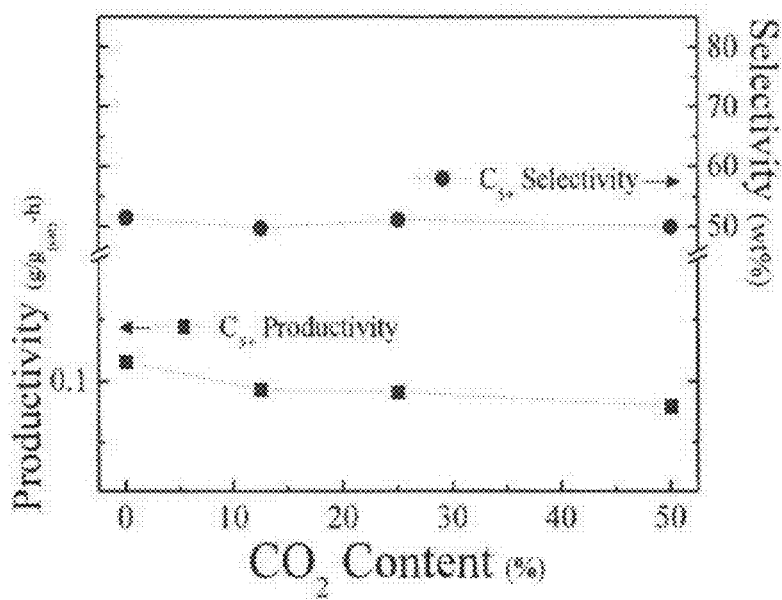

[FIG. 17]
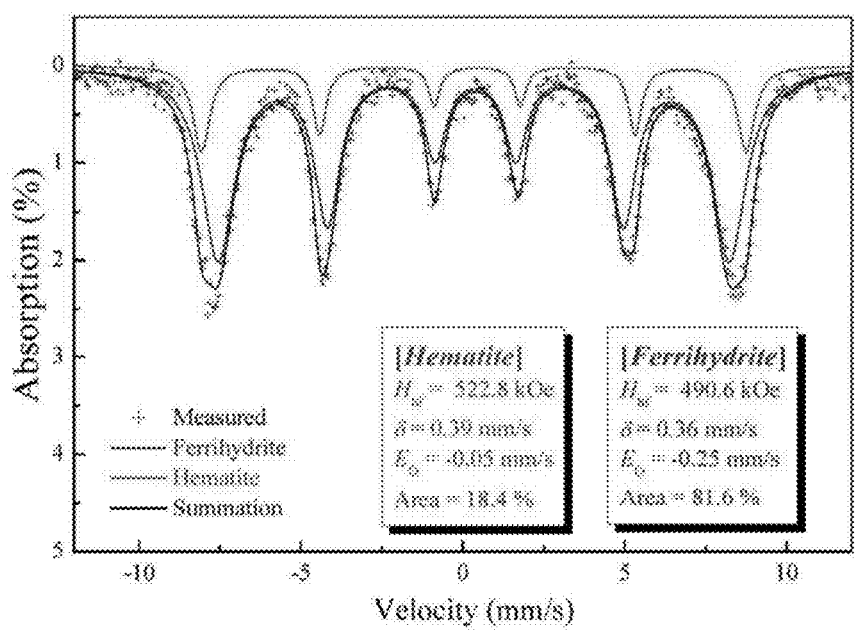

IRON-BASED CATALYST AND METHOD FOR PREPARING THE SAME AND USE THEREOF

TECHNICAL FIELD

The present invention relates to iron-based catalysts capable of preparing hydrocarbons at high selectivity by optimizing phase fractions of iron hydroxide, iron oxide, and iron carbide, a preparation method thereof, and a method for preparing liquid or solid hydrocarbons from syngas in the presence of the iron-based catalysts via the Fischer-Tropsch synthesis.

BACKGROUND ART

The Fischer-Tropsch synthesis first began with the development of a technique that produced synthetic fuels from syngas by gasification of coal, by German chemists Fischer and Tropsch in 1923. The Fischer-Tropsch synthesis is a reaction that converts syngas to hydrocarbons in the presence of a catalyst. Herein, an increase in the selectivity of the catalyst used may increase the productivity of hydrocarbons having at least 5 carbons ($C_{5+}$ hydrocarbons), an indicator of general productivity, thereby increasing the overall carbon efficiency.

Group VIII metals such as iron (Fe), cobalt (Co), nickel (Ni), ruthenium (Ru), and the like have been reported as materials that show activity for the Fischer-Tropsch synthesis. Among them, iron (Fe)-based catalysts have been recognized as beneficial due to their low preparation cost, superior performance, and activity for water-gas shift (WGS), specifically in the Fischer-Tropsch synthesis affiliated with indirect coal liquefaction.

Generally, catalysts used for the Fischer-Tropsch synthesis do not show any activity when in an as-prepared state. Accordingly, the catalysts need to be converted to an active state via reduction (activation) under appropriate conditions prior to synthesis.

Iron-based carbides have been known as a main active species in the iron-based catalysts, and various structures of metal/carbide/oxide are prepared complicatedly during reduction and reaction. Accordingly, when the iron-based catalysts were compared with Co—, Ni—, and Ru-based catalysts, which were merely used as metal active species, the performance thereof was highly dependent on the reduction conditions, and studies to simply increase the amount of iron-based carbides in catalysts showed limited improvement of catalyst performance. Specifically, the conventional studies showed limitations in inhibiting the formation of the unwanted byproducts $CO_2$, $CH_4$, and $C_2$ to $C_4$ hydrocarbons, and increasing the productivity of liquid hydrocarbons having at least 5 carbons ($C_{5+}$).

DISCLOSURE

Technical Problem

One objective of the present invention is to provide iron-based catalysts capable of increasing productivity of hydrocarbons having at least 5 carbons, and decreasing selectivity of the unwanted byproducts $CO_2$, $CH_4$, and $C_2$ to $C_4$ hydrocarbons.

Further, another objective of the present invention is to provide a method for preparing iron-based catalysts having superior performance which can be usefully applied to the Fischer-Tropsch synthesis.

Technical Solution

In a first aspect, the present invention provides iron-based catalysts including iron hydroxide, iron oxide, and iron carbide, wherein the number of iron atoms in a phase fraction of iron hydroxide ranges from 30% to 60%, the number of iron atoms in a phase fraction of iron oxide ranges from 10% to 30%, and the number of iron atoms in a phase fraction of iron carbide ranges from 10% to 50%, relative to 100% of the number of iron atoms contained in the iron-based catalysts.

In a second aspect, the present invention provides a method for preparing iron-based catalysts which are prepared from a first precursor including iron hydroxide and iron oxide.

In a third aspect, the present invention provides a method for preparing iron-based catalysts including: preparing a first precipitation slurry by mixing optionally an aqueous solution containing salt of metal selected from copper, cobalt, manganese, and a combination thereof, an aqueous solution containing acidic salt of iron, and a basic aqueous solution; preparing a second precipitation slurry by adding at least one oxide selected from silicon oxide, aluminum oxide, zirconium oxide, or chromium oxide, and optionally at least one aqueous solution containing an alkali metal or an alkaline earth metal, to the first precipitation slurry; preparing a second precursor by drying the second precipitation slurry; preparing a first precursor comprising iron hydroxide and iron oxide by calcining the second precursor; and preparing iron-based catalysts comprising iron hydroxide, iron oxide, and iron carbide by heating the first precursor under the gas atmosphere comprising carbon dioxide ($CO_2$), hydrogen ($H_2$), and carbon monoxide (CO).

In a fourth aspect, the present invention provides a method for preparing liquid or solid hydrocarbons from syngas via the Fischer-Tropsch synthesis in the presence of the iron-based catalysts of the first aspect.

In a fifth aspect, the present invention provides a method for preparing a hydrocarbon compound by the Fischer-Tropsch synthesis including: introducing a first precursor comprising iron hydroxide and iron oxide, or iron-based catalysts having a weight ratio between Fe, Cu, K, $SiO_2$, and Na of 100:1 to 10:1 to 20:10 to 50:1 to 20, into a first reactor and injecting a first gas comprising $CO_2$, $H_2$, and CO for reducing the first precursor or the iron-based catalysts, thereby forming the reduced iron-based catalysts; and preparing a hydrocarbon compound by reacting a second gas comprising $H_2$ and CO in a second reactor containing the reduced iron-based catalysts.

Hereinbelow, the present invention will be explained in detail.

In the present invention, industrially important iron-based catalysts for the Fischer-Tropsch synthesis (FTS) were prepared through precipitation, drying, and calcining processes, and phase fractions of the prepared iron-based catalysts were analyzed. Then, the catalysts were activated by heating in the presence of the gas for activation of the catalyst, and the phase fractions thereof were again analyzed. As a result, the phase of the catalysts before the activation consisted of iron hydroxide and iron oxide, and failed to show catalytic activity for FTS. However, they showed superior catalytic activity for FTS after the activation, and consisted of iron hydroxide, iron oxide, and iron carbide. Herein, it was found that the number of iron atoms in the phase fraction of iron hydroxide was 30% or more, and the number of iron atoms in the phase fraction of iron carbide was 50% or less, relative to 100% of the number of iron atoms contained in the iron-based catalysts. Further, in the present invention, the iron-based catalysts were activated using syngas containing various amount of $CO_2$ (0%, 20%, 33%, and 50%), and then the effect of $CO_2$ on the catalytic properties in the activation of syngas was investigated. As a result, it was found that the phase fraction of iron hydroxide in the catalysts activated by syngas containing $CO_2$ increased, which subsequently increased the number of iron atoms in the phase fraction of iron hydroxide and decreased the phase fraction of iron carbide, which further decreased the number of iron atoms in the phase fraction of iron carbide, thereby exhibiting even more superior selectivity for FTS. Accordingly, the present invention is based on the description above.

Specifically, in one Example of the present invention, $Fe/Cu/K/SiO_2$ catalysts were prepared as FTS iron-based catalysts, and phase fractions thereof were analyzed. Then, the catalysts were activated by heating in the presence of the gas for activation of the catalyst, and the phase fractions thereof were again analyzed. As a result, the phase of the catalysts before the activation consisted of ferrihydrite and hematite, which are iron hydroxide and iron oxide, respectively, and failed to show catalytic activity for FTS. However, the catalysts after the activation consisted of ferrihydrite (iron hydroxide), magnetite (iron oxide), and iron carbide. Further, it was confirmed that the number of iron atoms contained in the ferrihydrite was 30% or more, and the number of iron atoms contained in the iron carbide was 50% or less, relative to 100% of the number of iron atoms contained in the iron-based catalysts, thereby confirming that the catalysts showed superior catalytic activity for FTS within the scope of the phase fractions of the iron-based catalysts (Table 1).

Furthermore, in one Example of the present invention, the effect of $CO_2$ on reduction and carburization behaviors of the catalysts during the activation was confirmed, and compared with catalysts activated by syngas without containing $CO_2$ to confirm the performance of the catalysts activated by syngas containing $CO_2$. As a result, the phase fraction of iron hydroxide further increased and the phase fraction of iron carbide further decreased in the catalysts activated by syngas containing $CO_2$, thereby confirming that the catalysts exhibited even more superior selectivity for FTS (Table 1, FIG. 8).

The iron-based catalysts of the present invention, which include iron hydroxide, iron oxide, and iron carbide, have the number of iron atoms in a phase fraction of iron hydroxide from 30% to 60% and preferably from 48% to 57%, the number of iron atoms in a phase fraction of iron oxide from 10% to 30%, preferably from 18% to 29%, and more preferably from 22% to 29%, and the number of iron atoms in a phase fraction of iron carbide from 10% to 50% and preferably from 14% to 34%.

However, in the case in which each of the components deviates from the above scope, it leads to a decrease in the selectivity for $C_{5+}$ hydrocarbons, or an increase in the selectivity for $CO_2$, $CH_4$, and $C_2$ to $C_4$ hydrocarbons, thereby degrading catalytic performance.

The iron hydroxide may be ferrihydrite, and the iron oxide may be magnetite, hematite, or maghemite, and is preferably magnetite. The iron oxide may be a combination thereof in some cases.

The iron carbide may be $\epsilon$-carbide ($Fe_2C$), $\epsilon'$-carbide ($Fe_{2.2}C$), $\chi$-carbide ($Fe_{2.5}C$), and preferably it may include $\chi$-carbide ($Fe_{2.5}C$) and $\epsilon'$-carbide ($Fe_{2.2}C$). In the case in which the iron carbide includes h-carbide ($Fe_{2.5}C$) and $\epsilon'$-carbide ($Fe_{2.2}C$), the number of iron atoms contained in the iron-based catalysts may have a phase fraction such that the number of iron atoms contained in the iron hydroxide is from 48% to 57%, the number of iron atoms contained in the iron oxide is from 18% to 29%, the number of iron atoms contained in the $\chi$-carbide ($Fe_{2.5}C$) is from 6% to 24%, and the number of iron atoms contained in the $\epsilon'$-carbide ($Fe_{2.2}C$) is from 8% to 14%, relative to 100% of the number of iron atoms contained therein. Preferably, a phase fraction having the number of iron atoms contained in the iron hydroxide from 48% to 57%, the number of iron atoms contained in iron oxide from 22% to 29%, the number of iron atoms contained in the $\chi$-carbide ($Fe_{2.5}C$) from 6% to 24%, and the number of iron atoms contained in the $\epsilon'$-carbide ($Fe_{2.2}C$) from 8% to 14% is effective.

The iron-based catalysts of the present invention may be prepared from a first precursor including iron hydroxide and iron oxide.

In the present invention, "a first precursor" may refer to a material preceding an iron-based catalyst during the preparation process thereof, and "a second precursor" may refer to a material preceding the first precursor.

The fraction of iron atoms of each phase contained in the first precursor may have the number of iron atoms contained in the iron hydroxide from 65% to 86%, and the number of iron atoms contained in the iron oxide from 15% to 35%, relative to 100% of the number of iron atoms contained in the first precursor.

The iron hydroxide of the first precursor may be ferrihydrite, and the iron oxide thereof may be magnetite, hematite, or maghemite, and preferably magnetite. The iron oxide may be a combination thereof in some cases.

The iron-based catalysts of the present invention may be prepared by heating the first precursor under the gas atmosphere comprising carbon dioxide ($CO_2$), hydrogen ($H_2$), and carbon monoxide (CO). Herein, the volume of carbon dioxide may be from 25% to 60%, relative to 100% volume of the gases, and the volume ratio between hydrogen gas and carbon monoxide may be from 0.7:1 to 1.3:1.

In an embodiment of the present invention, wherein the iron-based catalysts of the present invention are prepared from the first precursor, the present invention includes a first precipitation slurry formation step (S10), a second precipitation slurry formation step (S20), a second precursor formation step (S30), a first precursor formation step (S40), and an iron-based catalyst preparation step (S50).

The first precipitation slurry formation step (S10) is a step for forming a first precipitation slurry by mixing optionally an aqueous solution containing salt of metal selected from copper, cobalt, manganese, and a combination thereof, an aqueous solution containing acidic salt of iron, and a basic aqueous solution. This step prepares a raw material solution, which becomes the basis of the iron-based catalysts of the present invention, and slurrifies the raw material solution using a precipitant.

The first precipitation slurry formation step (S10) forms a precipitation slurry containing iron by adding a basic aqueous solution, a precipitant, to an aqueous solution of acidic salt of iron containing iron, which is the main ingredient of the iron-based catalysts.

Aqueous solutions of nitrate, acetate, oxalate, and sulfate, and/or hydrochloride of iron may be used as the aqueous solution containing acidic salt of iron, but are not limited thereto.

Preferably, a precipitation slurry containing copper, cobalt, manganese, or a mixture thereof along with iron may be prepared by forming the first precipitation slurry, to which an aqueous solution containing salt of copper, cobalt, manganese, or a mixture thereof is further added. As such, the addition of copper, cobalt, manganese, or a mixture thereof may improve catalytic performance.

In the first precipitation slurry formation step, a first precipitation slurry may be prepared at a temperature range of 70° C. to 90° C., and preferably from 78° C. to 82° C. If the temperature is below 70° C., each ingredient may not be effectively mixed, whereas if the temperature exceeds 90° C. it may not be mixed in the appropriate concentrations due to evaporation of the aqueous solution.

The basic aqueous solution may specifically be a sodium carbonate ($Na_2CO_3$) aqueous solution, a sodium hydroxide (NaOH) aqueous solution, or ammonium hydroxide ($NH_4OH$).

The concentrations of the basic aqueous solutions may be from 1 mot/L to 5 mol/L, and preferably from 1.5 mol/L to 2.5 mol/L. If less than 1 mol/L is used, filtration and washing may be time-consuming due to a large amount of aqueous solution used, whereas if more than 5 mol/L is used, the pore structure may adversely affect catalytic performance as it fails to develop into a porous structure.

The pH of the first precipitation slurry may be from 7 to 9, and preferably from 7.8 to 8.2. If the pH is below 7 or exceeds 9, the precipitation slurry may be difficult to form.

After the formation of the first precipitation slurry, it may be filtered and washed with distilled water to remove unwanted ions, such as sodium ions, carbonate ions, nitrate ions, and the like, thereby improving catalytic performance and inhibiting unwanted reactions in the course of reactions.

The washing is preferably performed once or two consecutive times. If washing is performed three times or more, the remaining sodium is mostly removed as it has less than 1 part by weight relative to 100 parts by weight of iron, and thus sodium cannot function as a co-catalyst. Further, the amount of distilled water needed increases rapidly, and the washing period is significantly prolonged, decreasing economic feasibility and efficiency of the overall processes, if washing is repeated many times.

The second precipitation slurry formation step (S20) is a step for forming a second precipitation slurry co-precipitated with iron and metal oxides (e.g., silicon oxide, aluminum oxide, zirconium oxide, or chromium oxide) by adding the metal oxides to the first precipitation slurry.

Preferably, a precipitation slurry containing an alkali metal, an alkaline earth metal, or a mixture thereof along with metal oxides may be prepared by further adding aqueous solutions of salt of metal selected from an alkali metal, an alkaline earth metal, or a mixture thereof to form a second precipitation slurry. As such, addition of an alkali metal, an alkaline earth metal, or a mixture thereof may improve catalytic performance.

The oxides may play an important role in controlling phase fractions included in a first precursor, which will be described later, which enable the implementation of the first precursor consisting of a combination of iron hydroxides and iron oxides. Preferably, silicon oxide, aluminum oxide, zirconium oxide, and/or chromium oxide may be used as the oxides. Specifically, dry silica powder can be used for silicon oxide, and it can have a mean particle size of 5 nm to 20 nm.

The alkali metal may be lithium, sodium, potassium, and rubidium, and the alkaline earth metal may be magnesium, calcium, strontium, and barium. Preferably, aqueous solutions of sodium carbonate, potassium carbonate, magnesium carbonate, or calcium carbonate are effective.

The second precipitation slurry formed through the second precipitation slurry formation step (S20) has a weight ratio between iron (Fe) contained in the aqueous solution containing acidic salt of iron added during the formation of the first precipitation slurry, a metal contained in the aqueous solution of the metal salt added during the formation of the first precipitation slurry, a metal contained in the aqueous solution of an alkali metal or an alkaline earth metal added during the formation of the second precipitation slurry, and an oxide added during the formation of the second precipitation slurry is 100:3 to 7:3 to 7:5 to 30. If the metal content contained in the aqueous solutions of metal salt added in the first precipitation slurry formation step is less than 3 parts by weight relative to 100 parts by weight of iron, methane production increases during hydrocarbon production, whereas if the metal content exceeds 7 parts by weight relative to 100 parts by weight of iron, reaction activity may deteriorate. If the metal contained in the aqueous solution of an alkali metal or an alkaline earth metal added in the second precipitation slurry formation step is less than 3 parts by weight relative to 100 parts by weight of iron, it may be difficult to observe an inhibitory effect of methane formation, whereas if the metal content exceeds 7 parts by weight relative to 100 parts by weight of iron, the stability of the catalyst may deteriorate. Further, if the oxides added in the second precipitation slurry formation step deviate from the above range, the oxides may be uneconomical as the degree of increase of action thereof is not significant, and their activities may deteriorate.

The second precursor preparation step (S30) is a step for preparing a second precursor by drying the second precipitation slurry.

First, a second precursor may be obtained in the form of a powder by drying the second precipitation slurry prepared through the second precipitation slurry formation step (S20), and it is preferred to filter the second precipitation slurry through a sieve, followed by drying. The size of the sieve may be from 30 μm to 100 μm, and preferably from 50 μm to 70 μm. If the size exceeds 100 μm, the grinding effect of the clumped particles may be significantly reduced.

For a drying method, vacuum evaporation or spray drying may be used, but vacuum evaporation requires re-grinding of the resulting solid body, and thus spray drying is preferred.

A common drying method may be used for the drying method, and the inlet temperature is preferably from 200° C. to 400° C., and outlet temperature is preferably from 90° C. to 120° C. If the temperature deviates from the above range, the main components may be lost in the course of drying, degrading overall catalytic performance, and it may not be dried in the form of a uniform powder.

The second precursor may include iron hydroxide and iron oxide-hydroxide.

Herein, the iron hydroxide may be ferrihydrite, and the iron oxide-hydroxide may be goethite.

The first precursor preparation step (S40) is a step for preparing a first precursor containing iron hydroxide and iron oxide by calcining the second precursor prepared in the second precursor preparation step (S30) above. This step removes residual impurities, such as carbonate ions, nitrate ions, and the like by vaporizing them to produce a catalyst with high purity.

The calcining process may preferably be performed under the atmosphere.

The first precursor preparation step (S40) is preferably calcined at a temperature range of 300° C. to 500° C., more preferably from 350° C. to 450° C., and most preferably at 400° C. If the temperature is below 300° C., impurities may not be fully vaporized to be removed, and the effect of increasing physical strength of the catalysts may be insignificant, whereas if the temperature exceeds 500° C., the pore structure of the catalysts may collapse.

Also, the duration for calcining may be from 1 hour to 15 hours, and preferably from 5 hours to 12 hours. If the time duration is less than 1 hour, impurities may not be fully removed, whereas if the time duration exceeds 15 hours, economic feasibility decreases, and the pore structure collapses, thereby degrading catalytic performance.

The first precursor may include iron hydroxide and iron oxide, specifically the iron hydroxide may be ferrihydrite, and the iron oxide may be magnetite, hematite, or maghemite, and it may be a combination thereof in some cases. In the exemplary Example of the present invention, the first precursor may be formed by a combination of ferrihydrite and hematite.

The phase fractions of iron atoms contained in the first precursor may include the number of iron atoms contained in iron hydroxide ranging from 65% to 85%, and the number of iron atoms contained in iron oxide ranging from 15% to 35%, relative to 100% of the number of iron atoms contained in the first precursor.

The iron-based catalyst preparation step (S50) is a step for preparing iron-based catalysts through a reduction of the first precursor by heating in the presence of the gas for activation of the catalyst.

This step finally determines the pore structure and enables the catalysts to have phase fractions of iron hydroxide, iron oxide, and iron carbide.

The iron-based catalyst preparation step (S50) may prepare iron-based catalysts by heating the first precursor under the gas atmosphere comprising carbon dioxide ($CO_2$), hydrogen ($H_2$), and carbon monoxide (CO).

The first precursor may be activated by syngas containing carbon dioxide, hydrogen, and carbon monoxide, and the phase fractions of iron hydroxide, iron oxide, and iron carbide contained in the catalysts may be regulated by controlling the volume content of carbon dioxide and optimizing the reduction state.

The volume content of carbon dioxide capable of regulating the phase fractions of the iron-based catalysts, an important factor in determining performance of the catalysts, is preferably from 25% to 60%, and more preferably from 30% to 60% to be effective, relative to 100% gas volume. If the volume of carbon dioxide deviates from the above range, the productivity of hydrocarbons having at least 5 carbons ($C^{5+}$) decreases or the selectivity of $C_2$ to $C_4$ hydrocarbons increases, degrading catalytic performance as catalysts.

Further, the volume ratio between hydrogen and carbon monoxide may be from 0.7:1 to 1.3:1, and preferably, it is effective to have the same volume ratio between hydrogen and carbon monoxide.

Herein, the gases may be supplied at a flow rate of 2 $NL_{(CO2+H2+CO)}/g_{(cat)}$–h to 6 $NL_{(CO2+H2+CO)}/g_{(cat)}$–h under normal pressure.

The activation step or reduction step of the first precursor may be performed at a temperature range of 200° C. to 400° C. for 10 hours to 13 hours.

The iron-based catalysts prepared in the iron-based catalyst preparation step (S50) may have the number of iron atoms in a phase fraction of iron hydroxide ranging from 30% to 60%, and preferably from 48% to 57%, the number of iron atoms in a phase fraction of iron oxide ranging from 10% to 30%, preferably from 18% to 29%, and more preferably from 22% to 29%, and the number of iron atoms in a phase fraction of iron carbide ranging from 10% to 50%, and preferably from 14% to 34%, relative to 100% of the number of iron atoms contained in the iron-based catalysts.

In one embodiment of the present invention, Fe/Cu/K/$SiO_2$ catalysts were prepared through precipitation, drying, and calcination processes as iron-based catalysts for the Fischer-Tropsch synthesis (FTS), the phase fractions thereof were analyzed, the effect of $CO_2$ on the reduction and carburization behaviors of the catalysts during preprocess of activation was then confirmed, and the increased performance of catalysts activated by syngas containing $CO_2$ compared with catalysts activated by syngas without containing $CO_2$ was confirmed.

It was confirmed that the iron-based catalysts prepared according to the method of the present invention consisted of hematite and ferrihydrite, which are considered inactive in FTS before the activation (Example 1). The ferrihydrite is known to be a metastable phase at 400° C. Namely, the ferrihydrite is easily decomposed to the hematite by thermal treatment at 400° C. Therefore, the existence of ferrihydrite in the as-prepared catalysts, which were calcined at 400° C., is quite abnormal. The existence of ferrihydrite in the as-prepared catalysts is a characteristic feature of $SiO_2$ incorporated iron-based catalysts. It is because of this that the ferrihydrite phase, which formed in the precipitation process, is supposed to be stabilized in the presence of $SiO_2$. In other words, the ferrihydrite observed in the as-prepared catalysts has a high probability of possessing strong interaction with $SiO_2$.

During the activation pre-treatment using syngas, the hematite and ferrihydrite were reduced to magnetite and, subsequently, the magnetite was reduced and carburized to χ-carbide and ε'-carbide, active phases for the FTS. Therefore, in the present invention, it has been revealed that the addition of $CO_2$ significantly influences the reduction and carburization behavior of the as-prepared iron-based catalysts. FIG. 10 shows the phase conversion as a function of inlet $CO_2$ content during activation. The phase conversion is calculated from the results of Mössbauer analyses in FIG. 5 and Table 1. In FIG. 10, it is assumed that three kinds of major phase conversions were generated: (i) hematite to magnetite ('hm to mg'), (ii) ferrihydrite to magnetite ('fh to mg'), and (iii) magnetite to χ-carbide and ε'-carbide ('mg to χ+ε''). The phase conversion was calculated by the following equations:

'hm to mg' conversion (%)=($hm_{(AP)}$–$hm_{(A)}$)/$hm_{(AP)}$×100

'fh to mg' conversion (%)=($fh_{(AP)}$–$fh_{(A)}$)/$fh_{(AP)}$×100

'mg to χ+ε'' conversion (%)=($χ_{(A)}$+$ε'_{(A)}$)/($χ_{(A)}$+$ε'_{(A)}$+$mg_{(A)}$)×100 wherein $hm_{(AP)}$ and $fh_{(AP)}$ are respectively the contents of hematite and ferrihydrite in the as-prepared catalysts, and $hm_{(A)}$, $fh_{(A)}$, $mg_{(A)}$, $χ_{(A)}$, and $ε'_{(A)}$ are respectively the content of hematite, ferrihydrite, magnetite, χ-carbide, and ε'-carbide in the activated catalysts.

While the 'hm to mg' conversion was 100% regardless of the inlet $CO_2$ content during activation, the 'fh to mg' conversion showed a gradual decrease with increased $CO_2$ during activation. The 'fh to mg' conversion was significantly lower than the 'hm to mg' conversion through all the conditions. This implies that the ferrihydrite is less reducible than the hematite. It is assumed that the difference in the reducibility is attributed to the difference in the interaction with $SiO_2$. As described above, the strong interaction between $SiO_2$ and ferrihydrite may suppress the reduction of ferrihydrite to magnetite during the activation process. Furthermore, the difference in the reducibility between hematite and ferrihydrite is considered to result in the difference in the dependence of reduction behavior on the inlet $CO_2$ content during activation. Once the hematite is preferentially reduced to magnetite in a syngas atmosphere with $CO_2$, the RWGS reaction can occur over the magnetite surface, which leads to the competitive $H_2$ consumption between RWGS and reduction of ferrihydrite to magnetite. Moreover, the competitive $H_2$ consumption has no choice but to be equilibrated in the direction favorable for RWGS because more active sites for RWGS are generated as the reduction of ferrihydrite to magnetite proceeds. As a result, the reduction of ferrihydrite to magnetite was considerably suppressed by the $CO_2$.

In addition to the reduction behavior of hematite and ferrihydrite, the presence of $CO_2$ has a strong influence on the carburization behavior of magnetite. The 'mg to $\chi+\epsilon$'' conversion was about 80% in the absence of $CO_2$. This indicates that the magnetite was readily transformed to iron carbides in $CO_2$-free syngas once the hematite and ferrihydrite were reduced to magnetite. The 'mg to $\chi+\epsilon$'' conversion showed a considerable decrease with an increased inlet $CO_2$ content during activation. This means that the $CO_2$ restrains the carburization of magnetite to iron carbides. The carburization behavior of iron-based catalysts can be a function of carbon chemical potential ($\mu_C$) (E. de Smit et al., J. Am. Chem. Soc. 132 (2010) 14928-14941). In an atmosphere containing CO and $CO_2$, the $\mu_C$ is calculated as:

$$\mu_C = \mu_{CO} - \mu_{CO_2}$$

wherein $\mu_{CO}$ and $\mu_{CO2}$ are the CO chemical potential and the $CO_2$ chemical potential, respectively. As described in the above equation, the presence of $CO_2$ can decrease the $\mu_C$, resulting in the suppressed carburization of magnetite to iron carbides. This is consistent with the results of CO-TPR in FIG. 2, which shows considerable shrinkage of the second peak, which is indicative of carburization of magnetite in the presence of $CO_2$. The ratio of $\epsilon'$-carbide to $\chi$-carbide ($\epsilon'/\chi$) is also displayed in FIG. 10. The $\epsilon'/\chi$ ratio showed a considerable increase from 0.15 to 1.2 as the inlet $CO_2$ content during activation increased from 0% to 50%.

It was reported that the type of major iron carbides is strongly dependent on the temperature and $\mu_C$ (E. de Smit et al., J. Am. Chem. Soc. 132 (2010) 14928-14941). The lower temperature and the higher $\mu_C$ favor the formation of carbon-rich iron carbides: $\theta$-carbide ($Fe_3C$)→$Fe_7C_3$→$\chi$-carbide ($Fe_{2.5}C$)→$\epsilon'$-carbide ($Fe_{2.2}C$) or $\epsilon$-carbide ($Fe_2C$). In the present invention, it has been found that the activation using $CO_2$-containing syngas facilitates the formation of $\epsilon'$-carbide. This is quite anomalous in terms of $\mu_C$ since the presence of $CO_2$ decreases $\mu_C$. Therefore, it is worth considering the temperature effect even though the activation pre-treatment was carried out at the same temperature for the entire condition. Considering that the RWGS reaction is highly endothermic, the occurrence of RWGS in the syngas atmosphere with $CO_2$ may shift the phase equilibrium between $\epsilon'$-carbide and $\chi$-carbide to the lower temperature region favorable to the formation of $\epsilon'$-carbide.

In general, there are two major approaches to improving catalyst performance: one is to increase the effective performance of active sites, and the other is to increase the number of active sites. The results obtained in the present invention propose the first approach to improve the performance of iron-based catalysts for the FTS. FIG. 11 shows the productivity of hydrocarbons per unit mass of iron carbides during 66 hours to 114 hours of reaction as a function of the inlet $CO_2$ content during activation, which is calculated from the results of XRF, Mössbauer analyses (FIG. 5 and Table 1), and catalytic performance (FIG. 8). Interestingly, the activation using $CO_2$-containing syngas selectively increased the productivity of $C_{5+}$ hydrocarbons per the unit mass of iron carbides. This suggests that the intrinsic performance of $\epsilon'$-carbide is much higher than that of $\chi$-carbide, which corresponds well to the previous works (A. N. Pour et al., J. Nat. Gas Chem. 17 (2008) 242-248; R. P. Mogorosi et al., J. Catal. 289 (2012) 140-150). It was reported that carbon-rich iron carbides ($\epsilon'$-carbide or $\epsilon$-carbide) exhibited a much higher performance for the FTS than carbon-lean iron carbides ($\chi$-carbide or $\theta$-carbide), and the order of Fe—C bond strength is $\epsilon'$-carbide <$\chi$-carbide <$\theta$-carbide. Thus, the surface carbon on the $\epsilon'$-carbide is presumably more easily hydrogenated to form hydrocarbon monomers in the FTS than that on the h-carbide and $\theta$-carbide. As a result, the $\epsilon'$-carbide may show higher catalytic activity for the FTS than the $\chi$-carbide. Furthermore, as revealed in the results of TPH (FIG. 6 and Table 3), suppressed formation of inactive bulk carbon with increased $CO_2$ content during activation may contribute to the enhanced efficiency of active iron carbides. The formation of inactive bulk carbon is normally known to be detrimental to the catalyst performance because the bulk carbon may block the active sites.

The iron-based catalysts including iron hydroxide, iron oxide, and iron carbide may be used in the Fischer-Tropsch synthesis process, and specifically, are preferably used in the low-temperature Fischer-Tropsch synthesis process.

Accordingly, the present invention provides a method for preparing liquid or solid hydrocarbons from syngas via the Fischer-Tropsch synthesis in the presence of iron-based catalysts including iron hydroxide, iron oxide, and iron carbide.

Prior to preparing liquid or solid hydrocarbons from syngas via the Fischer-Tropsch synthesis, the existence of catalytic activity may be determined by confirming phase fractions of iron hydroxide and iron carbide contained in the iron-based catalysts. The phase fractions may be analyzed via Mössbauer spectroscopy.

Preferably, the iron-based catalysts exhibiting catalytic activity for FTS may have the number of iron atoms in the phase fraction of iron hydroxide ranging from 30% to 60%, the number of iron atoms in the phase fraction of iron oxide ranging from 10% to 30%, and the number of iron atoms in the phase fraction of iron carbide ranging from 10% to 50%, relative to 100% of the number of iron atoms contained in the iron-based catalysts. More preferably, the iron-based catalysts exhibiting catalytic activity for FTS may have the number of iron atoms contained in the phase fraction of iron hydroxide ranging from 48% to 57%, the number of iron atoms contained in the phase fraction of iron oxide ranging from 17% to 29%, and the number of iron atoms contained in the phase fraction of iron carbide ranging from 15% to 34%, relative to 100% of the number of iron atoms contained in the iron-based catalysts.

Accordingly, the method for preparing liquid or solid hydrocarbons from syngas via the Fischer-Tropsch synthesis according to the present invention includes:

introducing the iron-based catalysts into a Fischer-Tropsch synthesis reactor (step 1); and performing the Fischer-Tropsch synthesis in the presence of the iron-based catalysts by injecting syngas (step 2), wherein an activation (step 1-1) of the iron-based catalysts is further performed by heating in the presence of the gas for activation of the catalyst prior to step 2 if the number of iron atoms in a phase fraction of iron hydroxide is less than 30% or the number of iron atoms in a phase fraction of iron carbide exceeds 50%, relative to 100% of the number of iron atoms contained in the iron-based catalysts introduced in step 1.

The step 1-1 may be performed by heating the iron-based catalyst in the presence of the gas for activation of the catalyst selected from hydrogen gas, carbon monoxide, or a mixture thereof. Preferably, the gas for activation of the catalyst further comprises 5% to 50% of $CO_2$, relative to the total volume of the gas for activation of the catalyst. When $CO_2$ is further utilized as a component for the gas for activation of the catalyst, it may further increase the phase fraction of iron hydroxide in the iron-based catalysts, may further decrease the phase fraction of iron carbide, and may exhibit superior selectivity for FTS. specifically $C_{5+}$ selectivity.

Preferably, the condition of heat treatment during activation may be derived optimally by changing the activation temperature within the temperature range identical to FTS. The temperature range for heat treatment during activation may be from 240° C. to 275° C.

In the present invention, the step for preparing liquid or solid hydrocarbons from syngas via FTS using the iron-based catalysts showing catalytic activity for FTS may be performed at a reaction temperature range of 240° C. to 275° C. under a pressure range of 1.5 MPa to 2.25 MPa. If the reaction temperature drops below 240° C., $C_{5+}$ productivity may decrease, whereas if the reaction temperature exceeds 275° C., $C_{5+}$ selectivity may decrease (FIG. 12). If the pressure range deviates from the above range, both productivity and selectivity of $C_{5+}$ may decrease (FIG. 13).

Further, the Fischer-Tropsch synthesis step is performed with a space velocity range of 2.8 $NL/g_{(cat)}/h$ to 5.6 $NL/g_{(cat)}/h$. If the space velocity is below 2.8 $NL/g_{(cat)}/h$, $C_{5+}$ productivity may decrease, whereas if the space velocity exceeds 5.6 $NL/g_{(cat)}/h$, $C_{5+}$ selectivity may decrease (FIG. 14).

In the Fischer-Tropsch synthesis step, the syngas in which the ratio of $H_2/CO$ has been adjusted from 0.7 to 1.0 may be used. If the ratio of $H_2/CO$ is below 0.7. $C_{5+}$ productivity may decrease, whereas if the ratio of $H_2/CO$ exceeds 1.0, both $C_{5+}$ selectivity and $C_{5+}$ productivity may decrease (FIG. 15).

Preferably, the syngas in which 0.1% to 10% of $CO_2$ is further included relative to the overall volume of syngas may be used. If syngas containing more than 10% of $CO_2$ is used, $C_{5+}$ productivity may decrease (FIG. 16).

Furthermore, in the case in which the number of iron atoms in the phase fraction of iron hydroxide is equal to or more than 30% and the number of iron atoms in the phase fraction of iron carbide is equal to or less than 50%, relative to 100% of the number of iron atoms contained in the iron-based catalysts as described above, the present invention was confirmed to show catalytic activity for the Fischer-Tropsch synthesis. Activation conditions from which iron-based catalysts may be obtained are deduced first to activate the iron-based catalysts, and subsequently, the Fischer-Tropsch synthesis is performed under the activation condition to provide the optimized Fischer-Tropsch synthesis processes, thereby preparing liquid or solid hydrocarbons from syngas with superior productivity and selectivity.

The activation conditions may include the type and composition of the gas for activation of the catalyst, the temperature for heat treatment, and the treatment time for activation, etc., and the optimal activation conditions capable of increasing the performance of the iron-based catalysts used may be derived by altering these conditions.

The activation step may be performed in-situ in the FTS reactor.

Furthermore, in an one aspect, the present invention provides the method for preparing a hydrocarbon compound by the Fischer-Tropsch synthesis including:

introducing a first precursor comprising iron hydroxide and iron oxide, or iron-based catalysts having a weight ratio between Fe, Cu, K, $SiO_2$, and Na of 100:1 to 10:1 to 20:10 to 50:1 to 20, into a first reactor and injecting a first gas comprising $CO_2$, $H_2$, and CO for reducing the first precursor or the iron-based catalysts, thereby forming the reduced iron-based catalysts; and preparing a hydrocarbon compound by reacting a second gas comprising $H_2$ and CO in a second reactor containing the reduced iron-based catalysts.

In the iron-based catalysts, targets for reduction, copper may be used as a co-catalyst component having a weight ratio of 1 to 10, relative to weight ratio of iron of 100. If the copper metal content is less than the weight ratio of 1, methane production may increase, which would be problematic, whereas if the content thereof exceeds the weight ratio of 10, the reaction activity may decrease, which would also be problematic. The potassium metal plays a role in inhibiting methane production, and compounds containing potassium such as potassium nitrate, potassium carbonate, and the like may be used as precursors. If the potassium content is less than 1 part by weight, relative to 100 parts by weight of iron, it may be difficult to observe the inhibitory effect of methane production, whereas if the content thereof exceeds 20 parts by weight, the stability of the catalyst may decrease. Silicon oxides are used as a supporter and a catalyst dispersant, and 10 parts by weight to 50 parts by weight, relative to 100 parts by weight of iron, are preferably used. Herein, if the amount of silicon oxides used is less than 10 parts by weight, it cannot be used as a support as a small amount thereof is used, whereas if the amount of silicon oxides exceeds 50 parts by weight, it would be uneconomical as no increase in effect is observed due to the increase of use.

The reduction step may be performed at a temperature range of 200° C. to 400° C., and preferably from 250° C. to 350° C., for 10 hours to 30 hours, and preferably from 15 hours to 25 hours, under normal pressure. The hydrocarbon preparation step may be performed at a temperature range of 200° C. to 400° C., and preferably from 250° C. to 350° C., under a pressure range of 1 MPa to 4 MPa, and preferably from 1.5 MPa to 3 MPa.

The velocity of the first gas may be from 0.2 $NL_{(H2+CO)}/g_{(cat)}$-h to 1.0 $NL_{(H2+CO)}/g_{(cat)}$-h, and the velocity of the second gas may be from 2.0 $NL_{(H2+CO)}/g_{(cat)}$-h to 4.0 $NL_{(H2+CO)}/g_{(cat)}$-h, and preferably from 2.5 $NL_{(H2+CO)}/g_{(cat)}$-h to 3.5 $NL_{(H2+CO)}/g_{(cat)}$-h.

The second gas may further include at least one selected from $N_2$, $CO_2$, and $CH_4$.

The first reactor and the second reactor may be (i) identical in-situ means, (ii) connected with a pipe to supply the iron-based catalyst reduced in the first reactor to the second reactor on line, or (iii) separated such that the iron-based catalyst reduced in the first reactor is recovered, and then is supplied to the second reactor via an ex-situ method.

Advantageous Effects

The present invention may provide a method for preparing liquid or solid hydrocarbons specifically with superior productivity and selectivity for $C_{5+}$ hydrocarbons using iron-based catalysts including iron hydroxides, iron oxides, and iron carbides, in the Fischer-Tropsch synthesis using the same, wherein a number of iron atoms contained in iron hydroxide is equal to or more than 30%, and a number of iron atoms contained in iron carbide is equal to or less than 50%, relative to 100% of the number of iron atoms contained in the iron-based catalyst.

Further, the iron-based catalysts of the present invention show a superior effect in the low-temperature Fischer-Tropsch synthesis as it has high productivity to $C_{19+}$ hydrocarbons, the main products of the low-temperature Fischer-Tropsch synthesis.

Furthermore, it shows low productivity of $CO_2$, $CH_4$, and $C_2$ to $C_4$ hydrocarbons, which are unwanted byproducts in the Fischer-Tropsch synthesis, and high productivity of iron carbides, which are known as active species of the Fischer-Tropsch synthesis, thus exhibiting superior catalytic performance.

Accordingly, if the Fischer-Tropsch synthesis is performed, the production of unwanted byproducts, such as $CO_2$, $CH_4$, and $C_2$ to $C_4$ hydrocarbons, can be significantly inhibited, and the production of $C_{5+}$ and $C_{19+}$ hydrocarbons, which are the main products required, can be promoted.

BRIEF DESCRIPTION OF DRAWINGS

FIG. 1 is the $H_2$-TPR profiles of the as-prepared catalysts (a) in the absence of $CO_2$ and (b) in the presence of $CO_2$.

FIG. 2 is the CO-TPR profiles of the as-prepared catalysts (a) in the absence of $CO_2$ and (b) in the presence of $CO_2$.

FIG. 3 is a graph showing the syngas consumption for the activation of catalysts during the activation pre-treatment using syngas with different amounts of $CO_2$ as a function of activation time.

FIG. 4 is the XRD patterns of the catalysts activated by syngas with different amounts of $CO_2$: (a) 0% $CO_2$, (b) 20% $CO_2$, (c) 33% $CO_2$, and (d) 50% $CO_2$.

FIG. 5 is the Mössbauer spectra of the catalysts activated by syngas with different amounts of $CO_2$: (a) 0% $CO_2$, (b) 20% $CO_2$, (c) 33% $CO_2$, and (d) 50% $CO_2$.

FIG. 6 is the TPH spectra of the catalysts activated by syngas with different amounts of $CO_2$: (a) 0% $CO_2$, (b) 20% $CO_2$, (c) 33% $CO_2$, and (d) 50% $CO_2$.

FIG. 7 is a graph showing the overall CO conversion during 66 hours to 114 hours of reaction in the Fischer-Tropsch synthesis as a function of inlet $CO_2$ content during activation.

FIG. 8 is a graph showing the productivity of hydrocarbons during 66 hours to 114 hours of reaction in the Fischer-Tropsch synthesis as a function of inlet $CO_2$ content during activation.

FIG. 9 represents (a) the hydrocarbon distribution and the 1-olefin selectivity in $C_2$ to $C_4$ hydrocarbons during 66 hours to 114 hours of reaction in the Fischer-Tropsch synthesis as a function of inlet $CO_2$ content during activation, and (b) the carbon number distribution of $C_{5+}$ hydrocarbons and chain growth probability per each inlet $CO_2$ content during activation.

FIG. 10 shows the phase conversion as a function of the inlet $CO_2$ content during activation.

FIG. 11 shows the productivity of hydrocarbons per unit mass of iron carbides during 66 hours to 114 hours of reaction as a function of the inlet $CO_2$ content during activation, which is calculated from the results of XRF, Mössbauer analyses (FIG. 5 and Table 1), and catalytic performance (FIG. 8).

FIG. 12 shows analytical results of catalytic performance according to reaction temperature during the Fischer-Tropsch synthesis.

FIG. 13 shows analytical results of catalytic performance according to reaction pressure during the Fischer-Tropsch synthesis.

FIG. 14 shows analytical results of catalytic performance according to space velocity during the Fischer-Tropsch synthesis.

FIG. 15 shows analytical results of catalytic performance according to the ratio between $H_2$ and CO of syngas during the Fischer-Tropsch synthesis.

FIG. 16 shows analytical results of catalytic performance according to $CO_2$ content in syngas during the Fischer-Tropsch synthesis.

FIG. 17 shows a graph illustrating analytical results of phase fractions of the first precursor prepared in the iron-based catalyst preparation method of Example 1 via Mössbauer spectroscopy. It was confirmed that the first precursor consisted of a phase fraction consisting of 81.6% ferrihydrite and 18.4% hematite, based on the number of iron atoms.

BEST MODEL

Hereinafter, the present invention will be described in more detail with reference to the following examples, comparative examples, and experimental examples. However, the following examples, comparative examples, and experimental examples are provided for illustrative purposes only, and the scope of the present invention should not be limited thereto in any manner.

Example 1

Preparation of Iron-based FTS Catalysts

In the present invention, the iron-based FTS catalysts were prepared through a combination of a co-precipitation technique and a spray-drying method.

Specifically, a 2 M aqueous solution of $Fe(NO_3)_3$ and a 2 M aqueous solution of $Cu(NO_3)_2$ were mixed to prepare a mixed solution, and then a 2 M aqueous solution of $Na_2CO_3$ was added to the mixed solution at 80±1° C. until the pH reached 8.0±0.1.

The resultant precipitate slurry was filtered, washed with distilled water to sufficiently remove residual sodium, and subsequently re-slurried in distilled water. After completing the washing process, an aqueous $K_2CO_3$ solution and a colloidal suspension of $SiO_2$ were added to the precipitate slurry by controlling the weight ratio of Fe:Cu:K:$SiO_2$ to be 100:5:5:18, and the final mixture was spray-dried (inlet: 200° C.; outlet: 95° C.). Then, the spray-dried sample was calcined at 400° C. for 8 hours. The calcined catalysts were pressed into pellets and then crushed and sieved to obtain 300 μm to 600 μm particles.

Experimental Example 1

Characterization of as-prepared Catalysts

The chemical composition of the as-prepared catalysts in Example 1 was analyzed by X-ray fluorescence spectroscopy (XRF) using a Rigaku model ZSX Primus II. Further, the Brunauer-Emmett-Teller (BET) surface area, the single point pore volume, and the average pore diameter of the as-prepared catalysts were analyzed by means of $N_2$ physisorption using a Micrometrics model Tristar II 3020. The crystal structure of the as-prepared catalysts was characterized by X-ray diffraction (XRD) with a Rigaku DMAX-2500 using a Cu Kα source. The quantitative analysis on the phase structure was carried out by Mössbauer spectroscopy using a 50 mCi $^{57}$Co source in a rhodium matrix. The spectrometer was operated in the constant acceleration mode, and the spectra were recorded at −268.8° C. (=4.2 K) with a fixed absorber and a moving source. The spectra were deconvoluted based on the value of magnetic hyperfine field ($H_{hf}$), isomer shift (δ), and quadruple splitting ($E_Q$) for each iron-based species. The value of $H_{hf}$ was calibrated using metallic iron (α-Fe) foils.

The chemical composition of the as-prepared catalysts analyzed by XRF was 100 Fe/5.26 Cu/4.76 K/18.2 $SiO_2$ in parts by weight. The BET surface area, the single point pore volume, and the average pore diameter of the as-prepared catalysts were 183 $m^2/g$, 0.458 $cm^3/g$, and 9.98 nm, respectively. The crystal structure of the as-prepared catalysts was identified as a combination of hematite ($Fe_2O_3$) and ferrihydrite ($Fe_5O_7(OH).4H_2O$), as characterized by XRD and Mössbauer spectroscopy. The fractions of hematite and ferrihydrite analyzed by Mössbauer spectroscopy were 18.4% and 81.6%, respectively.

Experimental Example 2

Investigation of the Influence of $CO_2$ on the Reduction and Carburization Behavior of the Catalysts The influence of $CO_2$ on the reduction and carburization behavior of the catalysts was analyzed by means of temperature-programmed reduction using $H_2$ ($H_2$-TPR) or CO (CO-TPR) as a reducing agent. Two different carrier gases were used for each reducing agent: 5% $H_2$/Ar and 5% $H_2$/5% $CO_2$/Ar for the $H_2$-TPR and 5% CO/He and 5% CO/5% $CO_2$/He for the CO-TPR. The TPR was performed at up to 800° C. at a heating rate of 6° C./min, and the temperature was then held at the maximum temperature for 60 min. During the $H_2$-TPR process, the amount of $H_2$ or $CO_2$ consumption was analyzed with a quadruple mass spectrometer (MS) with a capillary inlet system. For the CO-TPR, the amount of CO consumption was measured by a thermal conductivity detector (TCD). Ascarite (223921, Aldrich) was used as a $CO_2$ removal trap to measure the true CO consumption profiles without considering the influence of $CO_2$ prepared during the CO-TPR.

The influence of $CO_2$ on the reduction behavior of the catalysts in the $H_2$ atmosphere was investigated by $H_2$-TPR, as shown in FIG. 1. In the absence of $CO_2$, the catalysts showed two distinct stages of reduction in the $H_2$ atmosphere. The first stage of reduction at 200° C. to 350° C. mainly indicates the reduction of hematite and a part of ferrihydrite to magnetite ($Fe_3O_4$), and the second stage of reduction at 350° C. to 800° C. mainly indicates the reduction of magnetite and residual ferrihydrite to metallic iron. In the case of $H_2$-TPR with $CO_2$, the $H_2$ was consumed via the reverse water-gas shift (RWGS) reaction in addition to the reduction of iron oxides:

$$CO_2 + H_2 \leftrightarrow CO + H_2O$$

Therefore, the $H_2$ consumption for the reduction of catalysts ($C_{H2\text{-}Red.(TPR)}$) was calculated as:

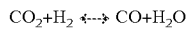

wherein $C_{H2\text{-}TOTAL(TPR)}$ and $C_{CO2(TPR)}$ are the total $H_2$ consumption and the total $CO_2$ consumption, respectively.

The signal of CO was also detected by MS. The total CO preparation was almost identical to the total $CO_2$ consumption, which confirms the occurrence of RWGS during the $H_2$-TPR with $CO_2$.

As shown in FIG. 1b, the first stage of reduction showed no considerable difference with and without the presence of $CO_2$. In contrast, the second stage of reduction nearly disappeared in the presence of $CO_2$ compared to the case in the absence of $CO_2$. This means that the reduction of magnetite and ferrihydrite to metallic iron in the $H_2$ atmosphere was significantly suppressed by the $CO_2$. The suppression in the second stage of reduction by $CO_2$ can be attributed to the preferential consumption of $H_2$ via RWGS over the magnetite surface. Magnetite is a well-known active phase for (R)WGS in the temperature range of 310° C. to 450° C.

The reduction and carburization behavior in the CO atmosphere either with or without $CO_2$ was analyzed by CO-TPR, as shown in FIG. 2. In the absence of $CO_2$, two major peaks were observed in the CO-TPR profiles: one is a small and sharp peak at about 212° C. and the other is a large and broad peak at about 349° C. The first peak indicates the reduction of hematite and a part of ferrihydrite to magnetite, and the second peak indicates the carburization of magnetite and residual ferrihydrite to iron carbides. Similar to the results of $H_2$-TPR, the first peak of the CO-TPR was barely affected by the $CO_2$, but the second peak considerably shrank when the CO-TPR was performed in the presence of $CO_2$. This implies that the $CO_2$ significantly suppresses the carburization of iron oxides without influencing the reduction of hematite to magnetite.

The in-situ activation behavior in the syngas atmosphere with different amounts of $CO_2$ was investigated by measuring the flow rates and composition of the outlet gases during the activation pre-treatment. FIG. 3 shows the syngas consumption for the activation of catalysts as a function of activation time. The syngas consumption for the activation of catalysts ($C_{Syngas\text{-}Acti.}$) was calculated as:

$$C_{Syngas\text{-}Acti.} = C_{H2\text{-}Total} + C_{CO\text{-}Total} - (C_{H2\text{-}FTS} + C_{CO\text{-}FTS})$$

wherein $C_{H2\text{-}Total}$ and $C_{CO\text{-}Total}$ are the total $H_2$ consumption and the total CO consumption, respectively, and $C_{H2\text{-}FTS}$ and $C_{CO\text{-}FTS}$ are the $H_2$ consumption via the FTS and the CO consumption via the FTS, respectively. The lower value of $C_{Syngas\text{-}Acti.}$ was observed at the higher inlet $CO_2$ content during activation, which implies that the iron-based catalysts can be mildly reduced and carburized in the syngas atmosphere with $CO_2$, compared to the case without $CO_2$. This corresponds well to the results of $H_2$-TPR and CO-TPR (FIGS. 1 and 2).

Example 2

Preparation of Activated Catalysts

The activated catalysts for characterization were prepared by exposing the as-prepared catalysts in Example 1 to the various activation environments. After exposing the catalysts to the activation environment for 20 hours, the reactor was cooled to room temperature and pressurized to 0.3 MPa. The reactor containing the activated catalysts was unloaded from the main reactor system using quick connectors (Swagelok. SS-QC4-D-400 and SS-QC4-B-200 for inlet and SS-QC6-D-600 and SS-QC6-B-600 for outlet) and transferred to a glove box in a $N_2$ atmosphere (purity: 99.999%). After carefully withdrawing the activated catalysts from the reactor, the catalysts were washed with hexane to remove residual liquid/solid hydrocarbons from the catalysts. The catalysts were passivated with a gas mixture of 1% $O_2$ in He at room temperature.

Experimental Example 3

Characterization of Activated Catalysts

The crystal structure of the activated catalysts was characterized by XRD and Mössbauer spectroscopy. The carbon content of the activated catalysts was analyzed by an ASTM E1019 method with an ELTRA GmbH model ONH2000. The BET surface area, the single point pore volume, and the average pore diameter of the activated catalysts were analyzed by means of $N_2$ physisorption. The carbonaceous species of the activated catalysts were characterized by temperature-programmed hydrogenation (TPH). The catalysts (about 50 mg) were loaded into the sample cell and purged with He at 40° C. for 30 min. The TPH was carried out at up to 900° C. in the flow of $H_2$ at a heating rate of 10° C./min, and the temperature was then held at the maximum temperature for 2 hours. The amount of $CH_4$ formation was measured by MS. A mass signal of 15 ($CH_3$ fragments of $CH_4$) was used instead of 16 to avoid the potential interference of water vapor and $CO_2$ cracking.

FIG. 4 shows the XRD patterns of the activated catalysts. The crystal structure of the activated catalysts can be identified as a combination of ferrihydrite, magnetite, χ-carbide ($Fe_{2.5}C$), and ϵ'-carbide ($Fe_{2.2}C$). This implies that hematite and a part of ferrihydrite in the as-prepared catalysts are reduced and carburized into magnetite and iron carbides during the activation pre-treatment. The catalysts had similar XRD patterns in terms of phase constitution regardless of the $CO_2$ content during activation. However, they displayed considerable difference in terms of the relative intensity of each phase depending on the $CO_2$ content during activation. Stronger peaks of ferrihydrite and magnetite and weaker peaks of iron carbides were observed at the higher $CO_2$ content during activation.

Detailed quantitative analyses on the phase structure were performed by Mössbauer spectroscopy, as shown in FIG. 5. The Mössbauer spectra at −268.8° C. were fitted with six sextets for all samples, which reflects ϵ'-carbide, χ-carbide, magnetite, and ferrihydrite with different hyperfine parameters. The results of Mössbauer deconvolution are summarized in Table 1 below.

TABLE 1

| Sample name | ϵ'-Carbide | χ-Carbide 8f | χ-Carbide 8f | χ-Carbide 4e | Magnetite | Ferrihydrite |
|---|---|---|---|---|---|---|
| 0CO₂ | | | | | | |
| $H_{hf}$ (kOe) | 185.7 | 258.4 | 211.6 | 112.2 | 510.6 | 475.7 |
| δ (mm/s) | 0.23 | 0.29 | 0.24 | 0.12 | 0.39 | 0.32 |
| $E_Q$ (mm/s) | 0.04 | 0.08 | −0.02 | 0.02 | −0.02 | −0.00 |
| Area (%) | 6.31 | 16.6 | 16.6 | 9.03 | 11.4 | 40.0 |
| 20CO₂ | | | | | | |
| $H_{hf}$ (kOe) | 187.8 | 257.1 | 208.7 | 103.2 | 510.1 | 485.4 |
| δ (mm/s) | 0.26 | 0.31 | 0.20 | 0.16 | 0.38 | 0.31 |
| $E_Q$ (mm/s) | 0.04 | 0.06 | 0.01 | 0.05 | −0.02 | −0.01 |
| Area (%) | 9.04 | 9.83 | 10.1 | 5.03 | 17.3 | 48.7 |
| 33CO₂ | | | | | | |
| $H_{hf}$ (kOe) | 188.0 | 265.9 | 213.3 | 100.6 | 510.1 | 475.6 |
| δ (mm/s) | 0.26 | 0.31 | 0.21 | 0.17 | 0.38 | 0.32 |
| $E_Q$ (mm/s) | 0.04 | 0.06 | 0.01 | 0.04 | −0.02 | −0.01 |
| Area (%) | 13.1 | 6.02 | 5.94 | 2.99 | 22.9 | 49.1 |
| 50CO₂ | | | | | | |
| $H_{hf}$ (kOe) | 189.6 | 262.4 | 210.5 | 103.8 | 508.8 | 478.8 |
| δ (mm/s) | 0.26 | 0.30 | 0.21 | 0.16 | 0.39 | 0.32 |
| $E_Q$ (mm/s) | 0.03 | 0.06 | 0.02 | 0.03 | −0.02 | −0.01 |
| Area (%) | 8.28 | 2.59 | 2.59 | 1.68 | 28.1 | 56.8 |

In the 0% $CO_2$, the content of iron carbides was about 49%, which means that about 49% of iron atoms in hematite and ferrihydrite in the as-prepared catalysts was reduced and carburized to χ-carbide and ϵ'-carbide after the activation pre-treatment. The content of iron carbides decreased with an increased $CO_2$ content during activation, and the content of magnetite and ferrihydrite showed the opposite tendency, which confirms the XRD results in FIG. 4. This also corresponds well to the TPR results (FIGS. 1 and 2) which show mild reduction and carburization of the catalysts when the TPR was carried out in the presence of $CO_2$. The evidence of hematite was detected in neither the XRD patterns nor the Mössbauer spectra while a considerable amount of ferrihydrite was observed, which suggests that the hematite is more reducible than the ferrihydrite. The total carbon content of the activated catalysts analyzed by ASTM E1019 is summarized in Table 2 below.

TABLE 2

| Sample name | $CO_2$ content during activation (%) | Total carbon content (wt %) | BET surface area (m²/g) | Pore volume (cm³/g) | Average pore size (nm) |
|---|---|---|---|---|---|
| 0CO₂ | 0 | 12.1 | 88.9 | 0.302 | 13.6 |
| 20CO₂ | 20 | 4.94 | 101 | 0.358 | 14.2 |
| 33CO₂ | 33 | 3.98 | 104 | 0.360 | 13.9 |
| 50CO₂ | 50 | 2.92 | 101 | 0.367 | 14.5 |
| As-prepared | | | 183 | 0.458 | 9.98 |

The carbon content showed a steep decrease with increased $CO_2$ content during activation. This indicates that the formation of carbonaceous species was significantly suppressed by the $CO_2$ during activation. This corresponds well to the result of CO-TPR (FIG. 2), which shows a considerable shrinkage of the second peak when the CO-TPR was performed in the presence of $CO_2$. Detailed analyses on the carbonaceous species were performed by TPH, as shown in FIG. 6. The smaller TPH profiles were observed at the higher $CO_2$ content during activation. This indicates that a smaller amount of carbonaceous species formed on the catalysts with an increased $CO_2$ content during activation. This is consistent with the result of ASTM E1019 in Table 2. The suppressed formation of carbon or carbonaceous species may be attributed to the decreased carbon chemical potential induced by the presence of $CO_2$.

The TPH profiles can be deconvoluted by five peaks: (i) reactive surface carbon below 450° C., (ii) $\epsilon'$-carbide at 480° C. to 530° C., (iii) $\chi$-carbide at 600° C. to 650° C., and (iv and v) inactive bulk carbon above 690° C. The peak temperatures and corresponding fractional areas are summarized in Table 3 below.

TABLE 3

| Sample name | Surface carbons | Iron carbides | | Bulk carbons | |
|---|---|---|---|---|---|
| | | $\epsilon'$-Carbide | $\chi$-Carbide | | |
| 0CO$_2$ | | | | | |
| Peak (° C.) | 400 | 488 | 636 | 709 | 839 |
| Area (%) | 7.77 | 6.32 | 19.6 | 48.0 | 18.3 |
| 20CO$_2$ | | | | | |
| Peak (° C.) | 379 | 496 | 611 | 720 | 825 |
| Area (%) | 21.5 | 15.3 | 37.3 | 17.6 | 8.24 |
| 33CO$_2$ | | | | | |
| Peak (° C.) | 385 | 497 | 613 | 707 | 798 |
| Area (%) | 33.4 | 18.2 | 26.8 | 12.2 | 9.43 |
| 50CO$_2$ | | | | | |
| Peak (° C.) | 403 | 527 | 618 | 720 | 824 |
| Area (%) | 40.1 | 21.1 | 16.0 | 15.4 | 7.32 |

In the case of 0% CO$_2$, the fraction of bulk carbon was about 66%, which indicates that the activation using CO$_2$-free syngas involves the considerable formation of inactive bulk carbon in addition to the formation of active iron carbides. In contrast, in the 20% to 50% CO$_2$, surface carbon, $\epsilon'$-carbide, and $\chi$-carbide were observed as major carbonaceous species. Specifically, the fraction of surface carbon, $\epsilon'$-carbide, and $\chi$-carbide was higher than 70% in total. This suggests that the activation using CO$_2$-containing syngas is beneficial to selective formation of active species for the iron-based FTS catalysts.

The textural properties of the activated catalysts analyzed by N$_2$ physisorption are summarized in Table 2. For easy comparison, the textural properties of the as-prepared catalysts are also inserted into Table 2. All the activated catalysts had a lower BET surface area and smaller pore volume than the as-prepared catalysts. This indicates that the initial pore structures of the as-prepared catalysts are inevitably degraded during the activation pre-treatment. Among the activated catalysts, the catalysts activated using CO$_2$-containing syngas (20% to 50% CO$_2$) had a higher BET surface area and larger pore volume than the catalysts activated using CO$_2$-free syngas (0% CO$_2$). As revealed in the results of XRD and Mössbauer spectroscopy, the mild reduction and carburization of the catalysts in the CO$_2$-containing syngas may reduce the degradation of pore structures during the activation pre-treatment.

Example 3

Conducting Fischer-Tropsch Synthesis by Using Syngas with Different CO$_2$ Content During the Activation and Analysis of Catalyst Performance The FTS was carried out in a fixed-bed reactor composed of stainless steel (5 mm i.d. and 180 mm length). The catalysts (0.8 g) were diluted with glass beads (1.6 g; 425 μm to 600 μm) and then charged into the fixed-bed reactor. The catalysts were activated in-situ using syngas (H$_2$/CO=1.0) with different amounts of CO$_2$ (0%, 20%, 30%, and 50%) at 280° C. and ambient pressure for 20 hours. In the activation process, a flow rate of H$_2$+CO at 2.8 NL/g$_{(cat)}$ h was maintained and the flow rate of CO$_2$ was increased for different levels of inlet CO$_2$ content. After the activation treatment, the FTS was performed at 275° C. and 1.5 MPa using CO$_2$-free syngas (H$_2$/CO=1.0, 2.8 NL/g$_{(cat)}$ h). The composition of the outlet gases was analyzed using an online gas chromatograph (GC; Agilent, 3000A Micro-GC) equipped with a molecular sieve and Plot Q columns. The flow rates of the outlet gases were measured by a wet-gas flow meter. The composition of wax and liquid products was analyzed with an offline GC (Agilent, 6890N) with a simulated distillation method (ASTM D2887).

The catalytic performance was evaluated in terms of CO conversion, and productivity and selectivity of hydrocarbons. The total CO conversion ($X_{CO(Total)}$) was calculated as:

$$X_{CO(Total)} (\%) = (F_{CO(In)} - F_{CO(Out)})/F_{CO(In)} \times 100$$

wherein $F_{CO(In)}$ and $F_{CO(Out)}$ are the inlet flow rate of CO and the outlet flow rate of CO, respectively. The total CO conversion can be divided into the CO conversion to hydrocarbons and the CO conversion to CO$_2$. The CO conversion to CO$_2$ ($X_{CO\ to\ CO2}$) was calculated as:

$$X_{CO\ to\ CO_2} (\%) = F_{CO2(Out)}/F_{CO(In)} \times 100$$

wherein $F_{CO2(Out)}$ is the outlet flow rate of CO$_2$. The CO conversion to hydrocarbons ($X_{CO\ to\ HC}$) was calculated as:

$$X_{CO\ to\ HC} (\%) = X_{CO(Total)} - X_{CO\ to\ CO_2}$$

The productivity of hydrocarbons from carbon number n to carbon number n+k ($P_{Cn-Cn+k}$) was calculated as:

$$P_{C_n - C_{n+k}} (g/g_{(cat)}/h) = \sum_{i=n}^{n+k} m_{C_i} / (m_{(cat)} \times \Delta t)$$

wherein $m_{Ci}$, $m_{(cat)}$, and $\Delta t$ are the mass of hydrocarbons with carbon number i prepared during the mass balance period, the mass of catalysts, and the time interval of mass balance period, respectively. The selectivity of hydrocarbons from carbon number n to carbon number n+k ($S_{Cn-Cn+k}$) was calculated as:

$$S_{C_n - C_{n+k}} (wt\ \%) = \sum_{i=n}^{n+k} m_{C_i} / m_{HC(Total)} \times 100$$

wherein $m_{HC(Total)}$ is the total mass of hydrocarbons prepared during the mass balance period.

As above, the influence of the activation using CO$_2$-containing syngas on the catalytic performance was evaluated in the FTS condition at 2750° C. In addition to the unreacted CO and H$_2$, gaseous hydrocarbons (CH$_4$ and C$_2$ to C$_4$ hydrocarbons) and CO$_2$ were detected in the outlet gases. Liquid hydrocarbons and H$_2$O were obtained in the cold trap (1° C.), and solid hydrocarbons were obtained in the hot trap (240° C.). This indicates that the formation of CO$_2$ via WGS accompanies the formation of hydrocarbons via the FTS as below:

$$nCO + (2n+1)H_2 \leftrightarrow C_nH_{2n+2} + nH_2O (n \geq 1)$$

$$nCO + 2nH_2 \leftrightarrow C_nH_{2n} + nH_2O (n \geq 2)$$

The CO and $H_2$ conversion showed a slight increasing trend with an increased reaction time. It was assumed that the overall catalytic performance during 66 hours to 114 hours of reaction is representative of the performance of the catalysts activated by syngas with different amounts of $CO_2$. FIG. 7 shows the overall CO conversion during 66 hours to 114 hours of reaction as a function of inlet $CO_2$ content during activation. The total CO conversion ($X_{CO(Total)}$) gradually decreased as the inlet $CO_2$ content during activation increased. The $X_{CO(Total)}$ can be divided into the CO conversion to hydrocarbons ($X_{CO\ to\ HC}$) and the CO conversion to CO2 ($X_{CO\ to\ CO2}$). The $X_{CO\ HC}$ and the $X_{CO\ to\ CO2}$ reflect the rate of hydrocarbon formation and the rate of $CO_2$ formation, respectively. The $X_{CO\ to\ HC}$ decreased with increased inlet $CO_2$ content during activation.

This is attributed to the suppressed preparation of undesired products, $CH_4$ and $C_2$ to $C_4$ hydrocarbons, as described in FIG. 8 below. The $X_{CO\ to\ CO2}$ also decreased with an increased $CO_2$ content during activation. This is considered to result from the decreased $X_{CO\ to\ HC}$. Since the formation of $CO_2$ via WGS occurs as a secondary reaction of FTS, the decreased formation of $H_2O$ via the FTS may decrease the formation of $CO_2$ via WGS.

FIG. 8 shows the productivity of hydrocarbons during 66 hours to 114 hours of reaction as a function of inlet $CO_2$ content during activation. The productivity of hydrocarbons can be used as a critical performance index of the FTS catalysts, which directly shows a combined value for the catalytic activity and selectivity. While the productivity of undesired products, $CH_4$ and $C_2$ to $C_4$ hydrocarbons, significantly decreased with an increased inlet $CO_2$ content during activation, the productivity of valuable products, $C_{5+}$ hydrocarbons, showed an even or slight increasing trend. In particular, the productivity of $C_{19+}$ hydrocarbons showed a dramatic increase as the inlet $CO_2$ content during activation increased. Specifically, the productivity of $C_{19+}$ hydrocarbons at 50% $CO_2$ (0.160 $g/g_{(cat)}h$) was about twice as high as the value at 0% $CO_2$ (0.0797 $g/g_{(cat)}h$). However, when the inlet $CO_2$ content during activation was higher than 50%, the productivity of $C_{5+}$ hydrocarbons and $C_{19+}$ hydrocarbons showed no further enhancement with an increased inlet $CO_2$ content during activation. Specifically, the productivity of $C_{5+}$ hydrocarbons and the productivity of $C_{19+}$ hydrocarbons at 67% $CO_2$ were 0.266 $g/g_{(cat)}$ h and 0.128 $g/g_{(cat)}$ h, respectively.

The effects of the activation using $CO_2$-containing syngas on the hydrocarbon selectivity are shown in FIG. 9. As shown in FIG. 9a, there was a considerable decrease in the selectivity of $CH_4$ and $C_2$ to $C_4$ hydrocarbons as the inlet $CO_2$ content during activation increased. In other words, the selectivity of $C_{5+}$ hydrocarbons remarkably increased with increased inlet $CO_2$ content during activation.

This suggests that the chain growth occurs more favorably over the catalysts activated by $CO_2$-containing syngas than by the case using $CO_2$-free syngas. In addition, the selectivity of I-olefins in $C_2$ to $C_4$ hydrocarbons showed a gradual increase with increased inlet $CO_2$ content during activation. This indicates that the chain termination as paraffin by secondary hydrogenation was relatively suppressed. The carbon number distribution of $C_{5+}$ hydrocarbons is also displayed in FIG. 9b. The carbon number distribution of $C_{5+}$ hydrocarbons corresponded well to the Anderson-Schulz-Flory (ASF) distribution as below:

$$\log(W_n/n) = \log \chi \cdot n + \log(\ln^2 \alpha)$$

wherein $W_n$ is the weight fraction of hydrocarbons with carbon number n, and $\alpha$ is the chain growth probability of the hydrocarbons. Two values of $\alpha$ ($\alpha 1$ from $C_7$ to $C_{16}$ and $\alpha 2$ from $C_{16}$ to $C_{44}$) can be obtained from two linear regressions. Both $\alpha 1$ and $\alpha 2$ values showed a significant increase with an increased inlet $CO_2$ content during activation, which confirms the favorable chain growth of hydrocarbon monomers over the catalysts activated by $CO_2$-containing syngas. Therefore, the activation of iron-based FTS catalysts using $CO_2$-containing syngas is considered highly beneficial to selective preparation of $C_{5+}$ hydrocarbons, in particular $C_{19+}$ hydrocarbons, in the low-temperature FTS process, without sacrificing the overall productivity of $C_{5+}$ hydrocarbons.

However, when the inlet $CO_2$ content during activation was higher than 50%, the selectivity of $C_{5+}$ hydrocarbons experienced no further improvement with an increased inlet $CO_2$ content during activation. Specifically, the selectivity of $C_{5+}$ hydrocarbons at 67% $CO_2$ was 77.2 wt %. This suggests that the beneficial effects of the activation using $CO_2$-containing syngas on the selectivity are significant below 50% $CO_2$.

Example 4

Conducting Fischer-Tropsch Synthesis Under the Different Condition and Analysis of Catalyst Performance As reaction conditions, each one of the reaction temperature, reaction pressure, space velocity, $H_2/CO$ ratio of syngas, and the $CO_2$ content was subject to change, while maintaining the rest of the reaction conditions. The Fischer-Tropsch synthesis was then performed and the catalytic performance was analyzed, as shown in Example 3.

The analytical results are shown in FIGS. 12 to 16.

It was confirmed through FIG. 12 that the desirability of the catalytic performance was achieved when the reaction temperature was adjusted between 240° C. to 275° C. during the Fischer-Tropsch synthesis. Specifically, if the temperature was below 240° C., $C_{5+}$ productivity decreased, whereas if the temperature exceeded 275° C., $C_{5+}$ selectivity decreased.

It was confirmed through FIG. 13 that the desirability of the catalytic performance was achieved when the reaction pressure was adjusted between 1.5 MPa to 2.25 MPa during the Fischer-Tropsch synthesis. Specifically, if the reaction pressure deviated from the above range, both $C_{5+}$ productivity and $C_{5+}$ selectivity decreased.

It was confirmed through FIG. 14 that the desirability of the catalytic performance was achieved when the space velocity was adjusted between 2.8 $NL/g_{(cat)}/h$ to 5.6 $NL/g_{(cat)}/h$ during the Fischer-Tropsch synthesis. Specifically, if the space velocity was below 2.8 $NL/g_{(cat)}/h$, $C_{5+}$ productivity decreased, whereas if the temperature exceeded 5.6 $NL/g_{(cat)}/h$, $C_{5+}$ selectivity decreased.

It was confirmed through FIG. 15 that the desirability of the catalytic performance was achieved when the $H_2/CO$ ratio of syngas was adjusted between 0.7 to 1.0 during the Fischer-Tropsch synthesis. Specifically, if the $H_2/CO$ ratio of syngas was below 0.7, $C_{5+}$ productivity decreased, whereas if the $H_2/CO$ ratio of syngas exceeded 1.0, $C_{5+}$ selectivity decreased.

It was confirmed through FIG. 16 that the desirability of the catalytic performance was achieved when the volume of syngas further contained 0.1% to 10% of $CO_2$ relative to the overall volume of syngas during the Fischer-Tropsch synthesis. Specifically, the use of syngas containing more than 10% $CO_2$ decreased $C_{5+}$ productivity.

Comparative Example 1

The iron-based catalyst having a composition weight ratio between Fe, Cu, K, $SiO_2$, and Na of 100:5.96:4.53:33.2:2.01 was charged into the Fischer-Tropsch synthesis reactor and reduced with a first gas containing $H_2$ and CO having a volume ratio of 1:1. The first gas was supplied at velocity of $0.6NL_{(H2+CO)}/g_{(cat)}$-h, and the reduction step was performed at 280° C. for 20 hours.

The preparation step for preparing a hydrocarbon compound was performed by injecting a second gas containing $H_2$ and CO having a volume ratio of 1:1 into the Fischer-Tropsch synthesis reactor where the reduction took place. The second gas was supplied at velocity of $3.0NL_{(H2+CO)}/g_{(cat)}$-h, and the preparation step was performed at 275° C. and 1.5 MPa to prepare a hydrocarbon compound using the Fischer-Tropsch synthesis.

Example 5

The hydrocarbon compound was prepared by the same method as in Comparative Example 1, except that the first gas containing $CO_2$, $H_2$, and CO having a volume ratio of 1:1:1 was used in the preparation method of the hydrocarbon compound using the Fischer-Tropsch synthesis. The results are shown in Table 4 below.

TABLE 4

| | Comparative Example 1 | Example 5 |
|---|---|---|
| Type of reducing gases | $H_2$ + CO ($H_2$/CO = 1/1) | $H_2$ + CO + $CO_2$ ($H_2$/CO/$CO_2$ = 1/1/1) |
| Time Interval (h) | 12 to 54 | 12 to 54 |
| CO Conversion (%) | 56.8 | 53.2 |
| Hydrocarbon Distribution (C-mol %) | 41.9 | 36.5 |
| $CH_4$ | 4.97 | 2.96 |
| $C_2$ to $C_4$ | 19.2 | 12.2 |
| $C_{5+}$ | 75.9 | 84.9 |
| $C_{5+}$ productivity (g/g(cat-h)) | 0.246 | 0.285 |

As shown in Table 4, in the case of Example 5, the selectivity for $CO_2$, $CH_4$, and $C_2$ to $C_4$ hydrocarbons were low, whereas the selectivity for $C_{5+}$ hydrocarbons was high, compared to Comparative Example 1. Further, although CO conversion slightly decreased in case of the Example 5, the increase in selectivity of $C_{5+}$ hydrocarbons was largely attributed to the overall increase in the selectivity of $C_{5+}$ hydrocarbon per each g of catalyst.

Although a preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. A method of making a catalyst, comprising:
preparing iron-based catalysts from a first precursor comprising iron hydroxide and iron oxide, wherein the number of iron atoms contained in the iron hydroxide ranges from 65% to 85%, and the number of iron atoms contained in the iron oxide ranges from 15% to 35%, relative to 100% of the number of iron atoms contained in the first precursor.

2. The method of claim 1, wherein the first precursor further comprises iron carbide and the number of iron atoms in a phase fraction of the iron hydroxide ranges from 30% to 60%, the number of iron atoms in a phase fraction of the iron oxide ranges from 10% to 30%, and the number of iron atoms in a phase fraction of the iron carbide ranges from 10% to 50%, relative to 100% of the number of iron atoms contained in the iron-based catalysts.

3. A method of making a catalyst, comprising:
preparing iron-based catalysts from a first precursor comprising iron hydroxide and iron oxide, wherein the iron hydroxide is ferrihydrite, and the iron oxide is selected from the group consisting of magnetite, hematite, maghemite, and a combination thereof.

4. The method of claim 3, wherein the first precursor further comprises iron carbide and the number of iron atoms in a phase fraction of the iron hydroxide ranges from 30% to 60%, the number of iron atoms in a phase fraction of the iron oxide ranges from 10% to 30%, and the number of iron atoms in a phase fraction of the iron carbide ranges from 10% to 50%, relative to 100% of the number of iron atoms contained in the iron-based catalysts.

5. A method of making a catalyst, comprising:
preparing iron-based catalysts from a first precursor comprising iron hydroxide and iron oxide, wherein the preparing iron-based catalysts comprises heating the first precursor under a gas atmosphere comprising carbon dioxide ($CO_2$), hydrogen ($H_2$), and carbon monoxide (CO).

6. The method of claim 5, wherein the volume of carbon dioxide is from 25% to 60%, relative to 100% volume of the gas atmosphere, and the volume ratio between hydrogen and carbon monoxide is from 0.7:1 to 1.3:1.

7. The method of claim 5, wherein the first precursor further comprises iron carbide and the number of iron atoms in a phase fraction of the iron hydroxide ranges from 30% to 60%, the number of iron atoms in a phase fraction of the iron oxide ranges from 10% to 30%, and the number of iron atoms in a phase fraction of the iron carbide ranges from 10% to 50%, relative to 100% of the number of iron atoms contained in the iron-based catalysts.

8. A method for preparing iron-based catalysts comprising:
preparing a first precipitation slurry by mixing optionally an aqueous solution containing salt of metal selected from copper, cobalt, manganese, and a combination thereof, an aqueous solution containing acidic salt of iron, and a basic aqueous solution;
preparing a second precipitation slurry by adding at least one oxide selected from silicon oxide, aluminum oxide, zirconium oxide, or chromium oxide, and optionally at least one aqueous solution containing an alkali metal or an alkaline earth metal, to the first precipitation slurry;
preparing a first precursor by drying the second precipitation slurry;
preparing a second precursor comprising iron hydroxide and iron oxide by calcining the second precursor; and
preparing iron-based catalysts comprising iron hydroxide, iron oxide, and iron carbide by heating the second precursor under the gas atmosphere comprising carbon dioxide ($CO_2$), hydrogen ($H_2$), and carbon monoxide (CO).

9. The method of claim 8, wherein, for the second precipitation slurry, a weight ratio of (i) iron (Fe) contained in the aqueous solution containing acidic salt of iron added during the formation of the first precipitation slurry is 100:3, a weight ratio of (ii) a metal contained in the aqueous solution of the metal salt added during the formation of the first precipitation slurry is 7:3, a weight ratio of (iii) a metal contained in the aqueous solution of an alkali metal or an alkaline earth metal added during the formation of the second precipitation slurry, and a weight ratio of (iv) an oxide added during the formation of the second precipitation slurry is 30:1.

10. The method of claim 8, wherein the first precursor comprises iron hydroxide and iron oxide-hydroxide.

11. The method of claim 10, wherein the iron hydroxide is ferrihydrite, and the iron oxide-hydroxide is goethite.

12. The method of claim 8, wherein the number of iron atoms in a phase fraction of the iron hydroxide ranges from 30% to 60%, the number of iron atoms in a phase fraction of the iron oxide ranges from 10% to 30%, and the number of iron atoms in a phase fraction of the iron carbide ranges from 10% to 50%, relative to 100% of the number of iron atoms contained in the iron-based catalysts.

\* \* \* \* \*